(12) United States Patent
King et al.

(10) Patent No.: US 6,307,549 B1
(45) Date of Patent: *Oct. 23, 2001

(54) REDUCED KEYBOARD DISAMBIGUATING SYSTEM

(75) Inventors: Martin T. King, Vashon, WA (US); Dale L. Grover, Lansing, MI (US); Clifford A. Kushler; Cheryl A. Grunbock, both of Vashon, WA (US)

(73) Assignee: Tegic Communications, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/420,282

(22) Filed: Oct. 18, 1999

Related U.S. Application Data

(63) Continuation of application No. 08/686,955, filed on Jul. 26, 1996, now Pat. No. 6,011,554, and a continuation of application No. 08/507,756, filed on Jul. 26, 1995, now Pat. No. 5,818,437.
(60) Provisional application No. 60/021,180, filed on Jun. 10, 1996.

(51) Int. Cl.⁷ .................................................. G06F 13/00
(52) U.S. Cl. .................. 345/352; 345/169; 707/6; 704/3; 704/4; 341/23
(58) Field of Search ............................. 345/168, 169, 345/352, 353; 707/3, 4, 5, 6; 704/239, 240, 251, 252, 271, 3, 4; 341/23, 67

(56) References Cited

U.S. PATENT DOCUMENTS 3,647,973   3/1972   James et al. .
3,967,273   6/1976   Knowlton .

(List continued on next page.)

FOREIGN PATENT DOCUMENTS

0213022 A1   3/1987   (EP) .
0319193 A3   6/1989   (EP) .

(List continued on next page.)

OTHER PUBLICATIONS

Swiffin et al., Adaptive and Predictive Techniques in a Communication Prothesis, AAC, pp. 181–191, 1987.*

(List continued on next page.)

*Primary Examiner*—Ba Huynh
(74) *Attorney, Agent, or Firm*—Christensen O'Connor Johnson Kindness PLLC

(57) ABSTRACT

A reduced keyboard disambiguating system (50) having a keyboard (54) with a reduced number of keys. A plurality of letters and symbols are assigned to a set of data keys (56) so that keystrokes entered by a user are ambiguous. Due to the ambiguity in each keystroke, an entered keystroke sequence could match a number of words with the same number of letters. The disambiguating system includes a memory (104) having a number of vocabulary modules (110). The vocabulary modules contain a library of objects that are each associated with a keystroke sequence. Each object is also associated with a frequency of use. Objects within the vocabulary modules that match the entered keystroke sequence are identified by the disambiguating system. Objects associated with a keystroke sequence that match the entered keystroke sequence are displayed to the user in a selection list (76). The objects are listed in the selection list according to their frequency of use. An unambiguous select key (60) is pressed by a user to delimit the end of a keystroke sequence. The first entry in the selection list is automatically selected by the disambiguating system as the default interpretation of the ambiguous keystroke sequence. The user accepts the selected interpretation by starting to enter another ambiguous keystroke sequence. Alternatively, the user may press the select key a number of times to select other entries in the selection list. For words that are not in the vocabulary modules, a two-stroke or multiple-stroke method are used to unambiguously specify each letter. The disambiguating system simultaneously interprets all entered keystroke sequences as a word, as a two-stroke sequence, and as a multiple-stroke sequence. The multiple interpretations are automatically and simultaneously provided to the user in the selection list.

31 Claims, 27 Drawing Sheets

U.S. PATENT DOCUMENTS

| | | |
|---|---|---|
| 4,191,854 | 3/1980 | Coles . |
| 4,360,892 | 11/1982 | Endfield . |
| 4,381,502 | 4/1983 | Prame . |
| 4,426,555 | 1/1984 | Underkoffler . |
| 4,427,848 | 1/1984 | Tsakanikas . |
| 4,442,506 | 4/1984 | Endfield . |
| 4,481,508 | 11/1984 | Kamei et al. . |
| 4,544,276 | 10/1985 | Horodeck . |
| 4,549,279 | 10/1985 | Lapeyre . |
| 4,649,563 | 3/1987 | Riskin . |
| 4,661,916 | 4/1987 | Baker et al. . |
| 4,669,901 | 6/1987 | Feng . |
| 4,674,112 | 6/1987 | Kondraske et al. . |
| 4,677,659 | 6/1987 | Dargan . |
| 4,744,050 | 5/1988 | Hirosawa et al. . |
| 4,754,474 | 6/1988 | Feinson . |
| 4,791,408 | 12/1988 | Heusinkveld . |
| 4,817,129 | 3/1989 | Riskin . |
| 4,823,294 | 4/1989 | Rouhani . |
| 4,846,598 | 7/1989 | Livits . |
| 4,849,732 | 7/1989 | Dolenc . |
| 4,866,759 | 9/1989 | Riskin . |
| 4,872,196 | 10/1989 | Royer et al. . |
| 4,891,777 | 1/1990 | Lapeyre . |
| 5,006,001 | 4/1991 | Vulcan . |
| 5,031,206 | 7/1991 | Riskin . |
| 5,035,205 | 7/1991 | Schiller et al. . |
| 5,063,376 | 11/1991 | Chang . |
| 5,065,661 | 11/1991 | Hacker . |
| 5,067,103 | 11/1991 | Lapeyre . |
| 5,087,910 | 2/1992 | Guyot-Sionnest . |
| 5,131,045 | 7/1992 | Roth . |
| 5,156,475 | 10/1992 | Zilberman . |
| 5,163,084 | 11/1992 | Kim et al. . |
| 5,200,988 | 4/1993 | Riskin . |
| 5,214,689 | 5/1993 | O'Sullivan . |
| 5,218,538 | 6/1993 | Zhang . |
| 5,229,936 | 7/1993 | Decker et al. . |
| 5,255,310 | 10/1993 | Kim et al. . |
| 5,258,748 | 11/1993 | Jones . |
| 5,281,966 | 1/1994 | Walsh . |
| 5,289,394 | 2/1994 | Lapeyre . |
| 5,305,205 | 4/1994 | Weber et al. . |
| 5,317,647 | 5/1994 | Pagallo . |
| 5,339,358 | 8/1994 | Danish et al. . |
| 5,388,061 | 2/1995 | Hankes . |
| 5,392,338 | 2/1995 | Danish et al. . |
| 5,535,421 | 7/1996 | Weinreich . |
| 5,664,896 | 9/1997 | Blumberg . |
| 5,786,776 | 7/1998 | Kisaichi et al. . |

FOREIGN PATENT DOCUMENTS

| | | |
|---|---|---|
| 0464726 A2 | 1/1992 | (EP) . |
| 0540147 A2 | 5/1993 | (EP) . |
| 0651315 | * 5/1995 | (EP) . |
| 0651315A1 | * 5/1995 | (EP) . |
| 0651315 A1 | 5/1995 | (EP) . |
| 0689122 A1 | 12/1995 | (EP) . |
| 0732646 A2 | 9/1996 | (EP) . |
| 2298166 A | 8/1996 | (GB) . |
| WO82/00442 | 2/1982 | (WO) . |
| WO89/05745 | 6/1989 | (WO) . |
| WO90/07149 | 6/1990 | (WO) . |
| WO96/27947 | 9/1996 | (WO) . |
| WO97/04580 | 2/1997 | (WO) . |
| WO97/05541 | 2/1997 | (WO) . |

OTHER PUBLICATIONS

Arnott et al, "Probabilistic Character Disambiguation for Reduced Keyboards Using Small Text Samples", AAC Augmentative and Alternative Communication, vol. 8, 1992.*

Levine, S.H. et al., "Adaptive Technique for Customized Interface Design With Application to Nonvocal Communication," *RESNA 9th Annual Conference*, Minneapolis, Minnesota, 1986.

Levine, S.H., "An Adaptive Approach to Optimal Keyboard Design for Nonvocal Communication," *IEEE*, 1985.

Swiffin, A.L. et al., "Adaptive and Predictive Techniques in a Communication Prosthesis," *AAC Augmentative and Alternative Communication* (*1987*).

Swiffin, A.L. et al., "PAL: An Effort Efficient Portable Communication Aid and Keyboard Emulator," *RESNA 8th Annual Conference*, Memphis, Tennessee, 1985.

Smith, Sidney L. et al., "Alphabetic Data Entry Via the Touch–Tone Pad: A Comment," *Human Factors*, 13(2), pp. 189–190, 1971.

Witten, I.H., "Principles of Computer Speech," New York: Academic Press, (1982), pp. 246–253.

Minneman, S.L., "A Simplified Touch–Tone® Telecommunication Aid for Deaf and Hearing Impaired Individuals," *RESNA 8th Annual Conference*, Memphis Tennessee, 1985.

Levine, S.H. et al., "Computer Disambiguation of Multi–Character Key Text Entry: An Adaptive Design Approach," *IEEE*, 1986.

Foulds, R. et al., "Lexical Prediction Techniques Applied to Reduce Motor Requirements for Augmentative Communication," *RESNA 10th Annual Conference*, San Jose, California, 1987.

Foulds, R.A. et al., "Statistical Disambiguation of Multi–Character Keys Applied to Reduce Motor Requirements for Augmentative and Alternative Communication," *AAC Augmentative and Alternative Communication* (1987).

Levine, S.H. et al., "Multi–Character Key Text Entry Using Computer Disambiguation," *RESNA 10th Annual Conference*, San Jose, California, 1987.

Kreifeldt, J.G. et al., "Reduced Keyboard Designs Using Disambiguation," *Proceedings of the Human Factors Society 33rd Annual Meeting—1989*.

Arnott, J.L. et al., "Probabilistic Character Disambiguation for Reduced Keyboards Using Small Text Samples," *AAC Augmentative and Alternative Communication*, vol. 8 (Sep. 1992).

King, M.T., "JustType™—Efficient Communication with Eight Keys," *Proceedings of the RESNA '95 Annual Conference*, Vancouver, BC, Canada, 1995.

Oommen, B.J. et al., "Correction to 'An Adaptive Learning Solution to the Keyboard Optimization Problem,'" *IEEE Transactions on Systems, Man, and Cybernetics*, 22:5 (Oct., 1992).

Matias, E. et al., "Half–QWERTY: Typing With One Hand Using Your Two–Handed Skills," *Conference Companion, CHI '94*, (Apr. 24–28, 1994).

Kamphuis, H. et al., "Katdas; A Small Number of Keys Direct Access System," *RESNA 12th Annual Conference*, New Orleans, Louisiana, 1989.

"Speed Keyboard for Data Processor," IBM Technical Disclosure Bulletin, vol. 23, pp. 838–839, Jul., 1980. © IBM Corp., 1993.

Sugimoto, M. et al., "SHK: Single Hand Key Card for Mobile Devices," *CHI 1996* (Apr. 13–18, 1996).

* cited by examiner

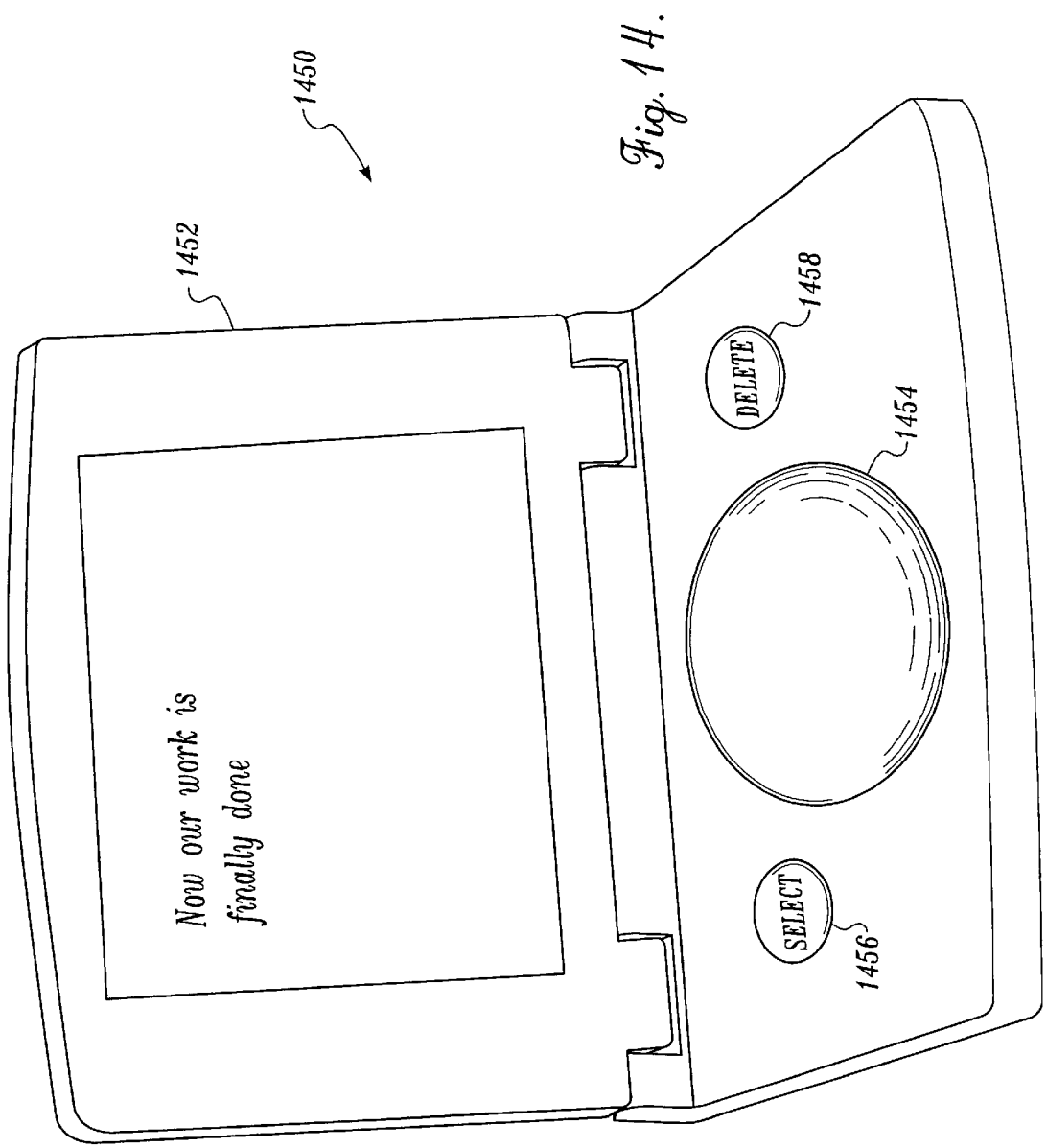

REDUCED KEYBOARD DISAMBIGUATING SYSTEM

RELATIONSHIP OF OTHER APPLICATIONS

This application is a continuation of U.S. patent application Ser. No. 08/686,955, filed Jul. 26, 1996, U.S. Pat. No. 6,011,554 which is a continuation-in-part of U.S. Provisional Application Ser. No. 08/021,180, filed Jun. 10, 1996 pending and U.S. patent application Ser. No. 08/507,756, filed Jul. 26, 1995, now U.S. Pat. No. 5,818,437, issued Oct. 16, 1998, the benefit of the filing of which is hereby claimed under 35 U.S.C. §120.

FIELD OF THE INVENTION

The invention relates generally to reduced keyboard systems, and more specifically to reduced keyboard systems using disambiguation to resolve ambiguous keystrokes.

BACKGROUND OF THE INVENTION

For many years, portable computers have been getting smaller and smaller. The principal size-limiting component in the effort to produce a smaller portable computer has been the keyboard. If standard typewriter-size keys are used, the portable computer must be at least as large as the keyboard. Miniature keyboards have been used on portable computers, but the miniature keyboard keys have been found to be too small to be easily or quickly manipulated by a user.

Incorporating a full-size keyboard in a portable computer also hinders true portable use of the computer. Most portable computers cannot be operated without placing the computer on a flat work surface to allow the user to type with both hands. A user cannot easily use a portable computer while standing or moving. In the latest generation of small portable computers, called Personal Digital Assistants (PDAs), companies have attempted to address this problem by incorporating handwriting recognition software in the PDA. A user may directly enter text by writing on a touch-sensitive panel or screen. Unfortunately, the accuracy and speed of the handwriting recognition software has to date been less than satisfactory.

It would therefore be advantageous to develop a keyboard for entry of text into a computer that is both small and operable with one hand while the user is holding the computer with the other hand. Prior development work has considered use of a keyboard that has a reduced number of keys. As suggested by the keypad layout of a Touch-Tone telephone, many of the reduced keyboards have used a 3-by-4 array of keys. Each key in the array of keys contains multiple characters. As a user enters a sequence of keys, there is therefore ambiguity in the resulting output since each keystroke may indicate one of several letters. Several approaches have been suggested for resolving the ambiguity of the keystroke sequence.

One suggested approach for unambiguously specifying characters entered on a reduced keyboard requires the user to enter two or more keystrokes to specify each letter. The keystrokes may be entered either simultaneously (chording) or in sequence (two-stroke specification). Neither chording nor two-stroke specification has produced a keyboard having adequate simplicity and efficiency of use. Two-stroke specification is inefficient, and chording is complicated to learn and use.

Other suggested approaches for determining the correct character sequence that corresponds to an ambiguous keystroke sequence are summarized in the article "Probabilistic Character Disambiguation for Reduced Keyboards Using Small Text Samples," published in the Journal of the International Society for Augmentative and Alternative Communication by John L. Arnott and Muhammad Y. Javad (hereinafter the "Arnott article"). The Arnott article notes that the majority of disambiguation approaches employ known statistics of character sequences in the relevant language to resolve character ambiguity in a given context. That is, existing disambiguating systems statistically analyze ambiguous keystroke groupings as they are being entered by a user to determine the appropriate interpretation of the keystrokes. The Arnott article also notes that several disambiguating systems have attempted to use word level disambiguation to decode text from a reduced keyboard. Word level disambiguation disambiguates entire words by comparing the sequence of received keystrokes with possible matches in a dictionary after the receipt of an unambiguous character signifying the end of the word. The Arnott article discusses many of the disadvantages of word-level disambiguation. For example, word level disambiguation oftentimes fails to decode a word correctly, because of the limitations in identifying unusual words and the inability to decode words that are not contained in the dictionary. Because of the decoding limitations, word level disambiguation does not give error-free decoding of unconstrained English text with an efficiency of one keystroke per character. The Arnott article therefore concentrates on character level disambiguation rather than word level disambiguation, and indicates that character level disambiguation appears to be the most promising disambiguation technique.

Still another suggested approach is disclosed in a textbook entitled *Principles of Computer Speech*, authored by I. H. Witten, and published by Academic Press in 1982 (hereinafter the "Witten approach"). Witten discusses a system for reducing ambiguity from text entered using a telephone touch pad. Witten recognizes that for approximately 92% of the words in a 24,500 word dictionary, no ambiguity will arise when comparing the keystroke sequence with the dictionary. When ambiguities do arise, however, Witten notes that they must be resolved interactively by the system presenting the ambiguity to the user and asking the user to make a selection between the number of ambiguous entries. A user must therefore respond to the system's prediction at the end of each word. Such a response slows the efficiency of the system and increases the number of keystrokes required to enter a given segment of text.

Disambiguating an ambiguous keystroke sequence continues to be a challenging problem. As noted in the publications discussed above, satisfactory solutions that minimize the number of keystrokes required to enter a segment of text have failed to achieve the necessary efficiencies to be acceptable for use in a portable computer. Moreover, the publications have taught away from using word level disambiguation and have focused on character level disambiguating techniques. It would therefore be desirable to develop a disambiguating system that minimizes the ambiguity of entered keystrokes and thereby maximizes the efficiency of text entry.

SUMMARY OF THE INVENTION

The present invention provides a reduced keyboard using word level disambiguation to resolve ambiguities in keystrokes. The keyboard is constructed with full-size keys, preferably twelve keys arrayed in three columns and four rows or three rows and four columns. A plurality of letters and symbols are assigned to at least several of the keys, so that keystrokes by a user are ambiguous. A user enters a keystroke sequence wherein each keystroke corresponds to the entry of one letter of a word. Because individual keystrokes are ambiguous, the keystroke sequence could potentially match more than one word with the same number of letters. The keystroke sequence is processed by comparing the keystroke sequence with stored vocabulary modules to match the sequence with corresponding stored words or other interpretations. Words that match the sequence of keystrokes are simultaneously and automatically presented to the user in a list on a display as each keystroke is received (hereinafter referred to as "the selection list"). The other interpretations of the keystroke sequence are also provided to the user in the selection list. The words and other interpretations are presented in order of decreasing frequency of use, with the most commonly used word presented first.

In accordance with one aspect of the invention, the user presses an unambiguous select key to delimit an entered keystroke sequence. After receiving the select key, the disambiguating system automatically selects the most commonly used word and adds the word to the sentence being constructed if the user continues to enter additional text.

In accordance with another aspect of the invention, the select key that is pressed by the user to delimit the end of a word is also used to select less commonly used words from the selection list presented to the user. If the most commonly used word presented to the user at the top of the selection list is not the desired word, the user presses the select key again to advance from the most frequently used word to the second most frequently used word, and again to advance to the third most frequently used word, and so on. By repetitively pressing the select key, the user may therefore select the desired word from the selection list. Upon reaching the end of the displayed selection list, additional less commonly used words scroll into the selection list with continued presses of the select key. The reduced keyboard disambiguating system automatically inserts the appropriate spacing between the words.

In accordance with yet another aspect of the invention, multiple interpretations of the keystroke sequence are provided to the user in the selection list. The keystroke sequence is interpreted as forming a word, and the corresponding word is displayed in the selection list. Simultaneously, the keystroke sequence is interpreted as a number, as a word entered using a two-stroke or multiple-stroke specification method, as a stem of an uncompleted word, or as a system command. The multiple interpretations are simultaneously presented to the user for each keystroke of a keystroke sequence entered by the user. The user may select from the alternate interpretations by pressing the select key a number of times.

In accordance with still another aspect of the invention, a method to enter words that are not contained in the vocabulary is provided. To enter unusual words, such as proper names, a two-stroke specification method is used. A first keystroke indicates the key containing the letter, and a second keystroke disambiguates the first keystroke. Preferably, the system simultaneously interprets each sequence of keystrokes as both an ambiguous sequence of one stroke per letter and as a fully specified sequence of two strokes per letter.

In accordance with still another aspect of the invention, a second method to enter unusual words that are not contained in the vocabulary is provided, using a multiple-stroke specification method. In this method, a sequence of keystrokes is interpreted as unambiguously specifying a specific string of alphabetic characters by requiring from one to three keypresses per letter. Preferably, each key contains up to three letters that are arranged in a row on the top of each key. The letters are ordered from left to right on each keytop in order of decreasing frequency, so that the most frequently occurring letter is in the leftmost position. Each letter of a word may be unambiguously spelled by pressing the key on which the letter appears a number of times corresponding to the position of the desired letter in the row. Thus, the leftmost letter is specified by a single keypress, the center letter by two keypresses, and the rightmost letter by three keypresses. The system simultaneously interprets each sequence of keystrokes as both an ambiguous sequence of one stroke per letter and as a fully specified sequence using the multiple-stroke specification method.

At the user's option, either or both of the two-stroke and multiple-stroke interpretations are displayed in the selection list of possible words. The user therefore does not have to change modes to enter words using either of these specification methods. Instead, when the user wants to enter a word that is not in the vocabulary, the user simply uses the preferred specification method, and then presses the select key to move down the selection list and select the desired interpretation of the keystroke sequence. In the vast majority of cases, these interpretations will be the only valid choices left in the selection list, so that only one or two presses of the select key will be required.

In accordance with yet another aspect of the invention, words that are entered by the user using the two-stroke or multiple-stroke specification methods that are not in a vocabulary module are automatically added to a vocabulary module. The added words can subsequently be displayed upon entry of one stroke per letter.

In accordance with still another aspect of the invention, words are stored in a vocabulary module using a tree data structure. Words corresponding to a particular keystroke sequence are constructed using the set of words associated with an immediately preceding keystroke sequence (i.e., the particular keystroke sequence without the last keystroke). Constructing words in this manner greatly reduces the storage space of the vocabulary module.

In accordance with yet another aspect of the invention, letters are assigned to the keys in a non-sequential order. Rather than assigning the letters from "a" to "z" the letters are grouped onto the keys in a manner that reduces the frequency of ambiguities during word entry. In particular, the letters are assigned on the keys to take into account the frequency of use of each word in the disambiguating system's vocabulary modules. That is, the letters are grouped to reduce the ambiguities between the most commonly entered words. The grouping of the letters on the keys is therefore optimized with respect to one or more preferred vocabulary modules that include information regarding the frequency of common usage.

In accordance with still another aspect of the invention, the keyboard of the reduced keyboard disambiguating system may be replaced with an input device movable to multiple states. Each state is associated with a keystroke, allowing a user to input text by appropriate movement of the input device.

The combined effects of the non-sequential and optimized assignment of letters to keys, the delimiting of words using a select key, the presentation of the most commonly occurring word as the first word in the selection list, the inclusion of multiple interpretations in the selection list, the automatic addition of a selected word to a sentence by the first keystroke of the following word, and the automatic addition of spaces produces a surprising result: for over 99% of entered words, the same number of keystrokes is required to enter a word with the reduced key disambiguating system as for word entry with a conventional keyboard. Because ambiguities are reduced and the words are presented in frequency of use order, the desired word is most often the first word presented and is frequently the only word presented. The user simply proceeds to enter the next word with no more than the usual number of keystrokes. High speed entry of text is therefore achieved using a keyboard having a small number of full-size keys.

Moreover, the reduced keyboard disambiguation system disclosed herein also minimizes the size of the computer or other device that incorporates the system. The reduced number of keys allows a device to be constructed that may be held by the user in one hand, while being operated with the other hand. The disclosed system is therefore particularly advantageous for use with PDAs, two-way pagers, or other small electronic devices that would benefit from accurate and high-speed text entry.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIGS. 8A–8J depict the display of the preferred embodiment of the reduced keyboard disambiguating system of the present invention during a representative use of the preferred disambiguation method;

FIG. 14 is a front perspective of still another alternate embodiment of a disambiguating system in accordance with the present invention, having a control disk replacing the reduced keyboard;

DETAILED DESCRIPTION OF THE PREFERRED EMBODIMENT

I. System Construction and Basic Operation

Figure 1A:
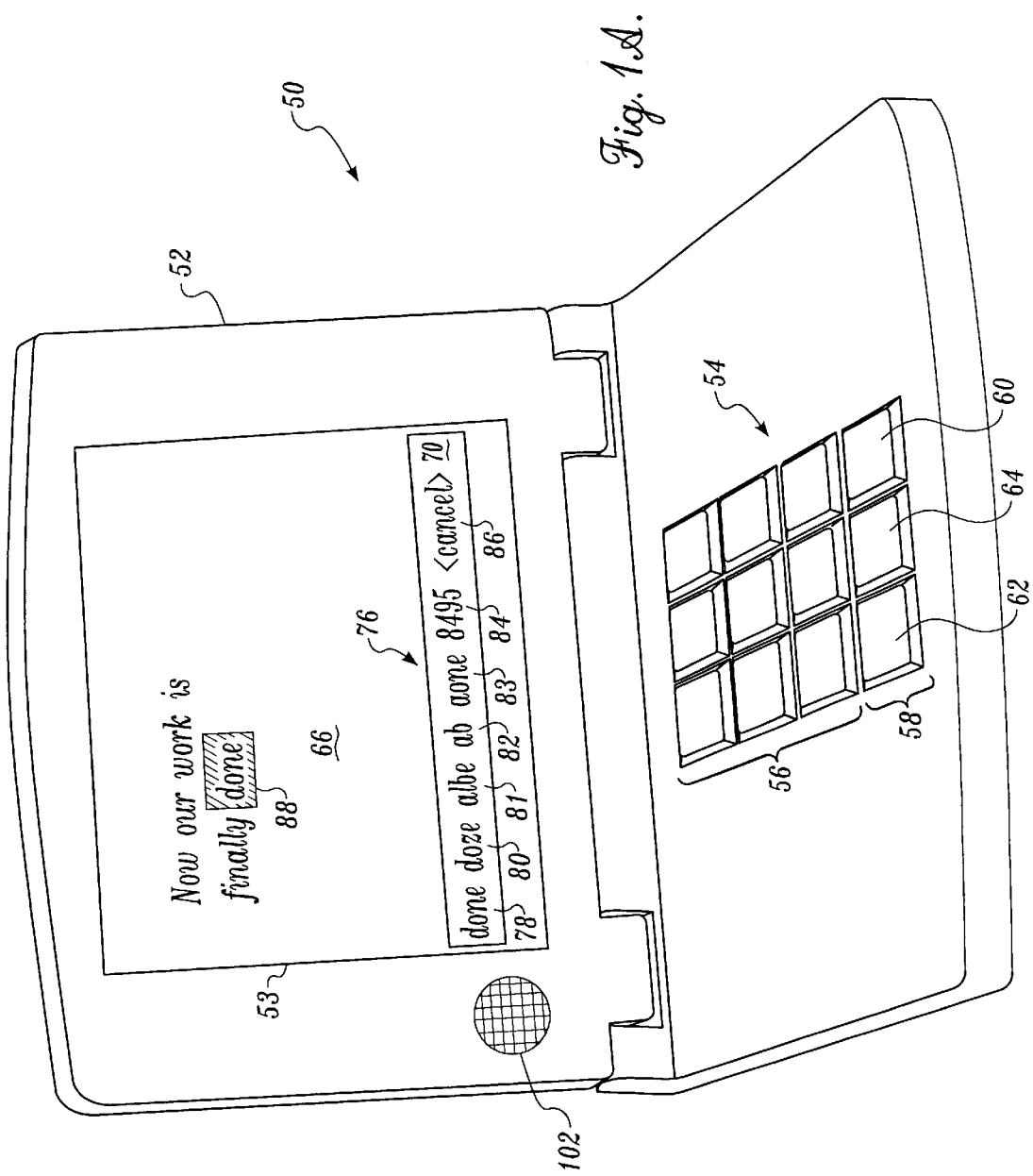
FIGS. 1A and 1B are perspective views of a preferred embodiment of a portable computer incorporating a reduced keyboard disambiguating system of the present invention, the disambiguating system including a reduced keyboard and a display for displaying text and a selection list.
Figure 1B:
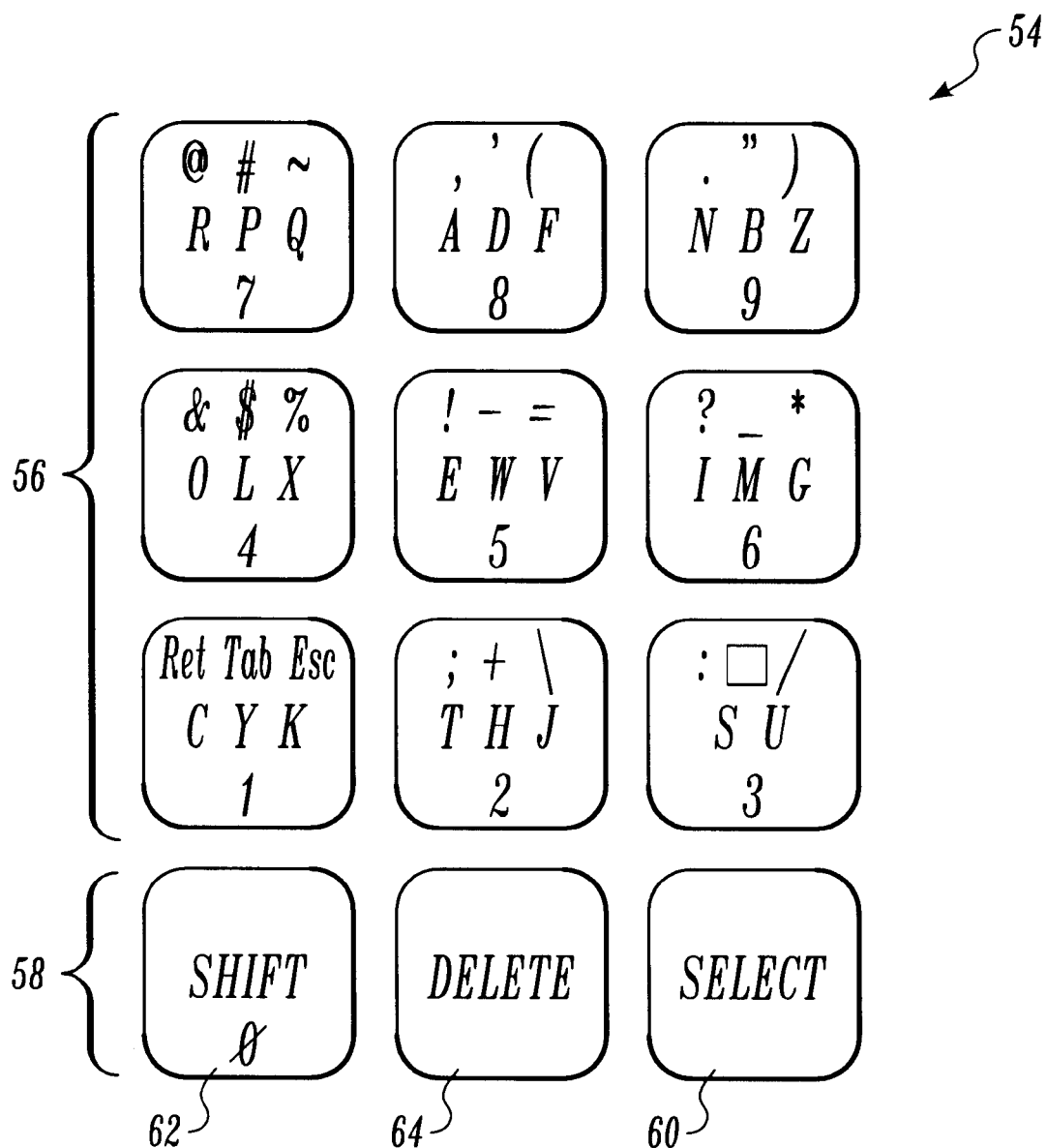

With reference to FIG. 1A a reduced keyboard disambiguating system 50 formed in accordance with the present invention is depicted incorporated in a palmtop portable computer 52. Portable computer 52 contains a reduced keyboard 54 and a display 53. For purposes of this application, the term "keyboard" is defined broadly to include any input device having discrete mechanical keys, membrane keys, or defined areas on a touch screen, for example. Keyboard 54 has a reduced number of data entry keys from a standard QWERTY keyboard. Preferably, the keyboard contains twelve standard full-sized keys arranged in three columns and four rows. More specifically, the preferred keyboard contains nine data keys 56 arranged in a 3-by-3 array, and a bottom row of three system keys 58, including a select key 60, a shift key 62, and a delete key 64. A preferred arrangement of the letters and symbols on each key in the keyboard 54 is depicted in FIG. 1B.

Data is input into the disambiguation system via keystrokes on the reduced keyboard 54. As a user enters a keystroke sequence using the keyboard, text is displayed on the computer display 53. Two regions are defined on the display to display information to the user. An upper text region 66 displays the text entered by the user and serves as a buffer for text input and editing. A selection list region 70, located below the text region, provides a list of words and other interpretations corresponding to the keystroke sequence entered by a user. As will be described in additional detail below, the selection list region aids the user in resolving the ambiguity in the entered keystrokes.

Figure 2:
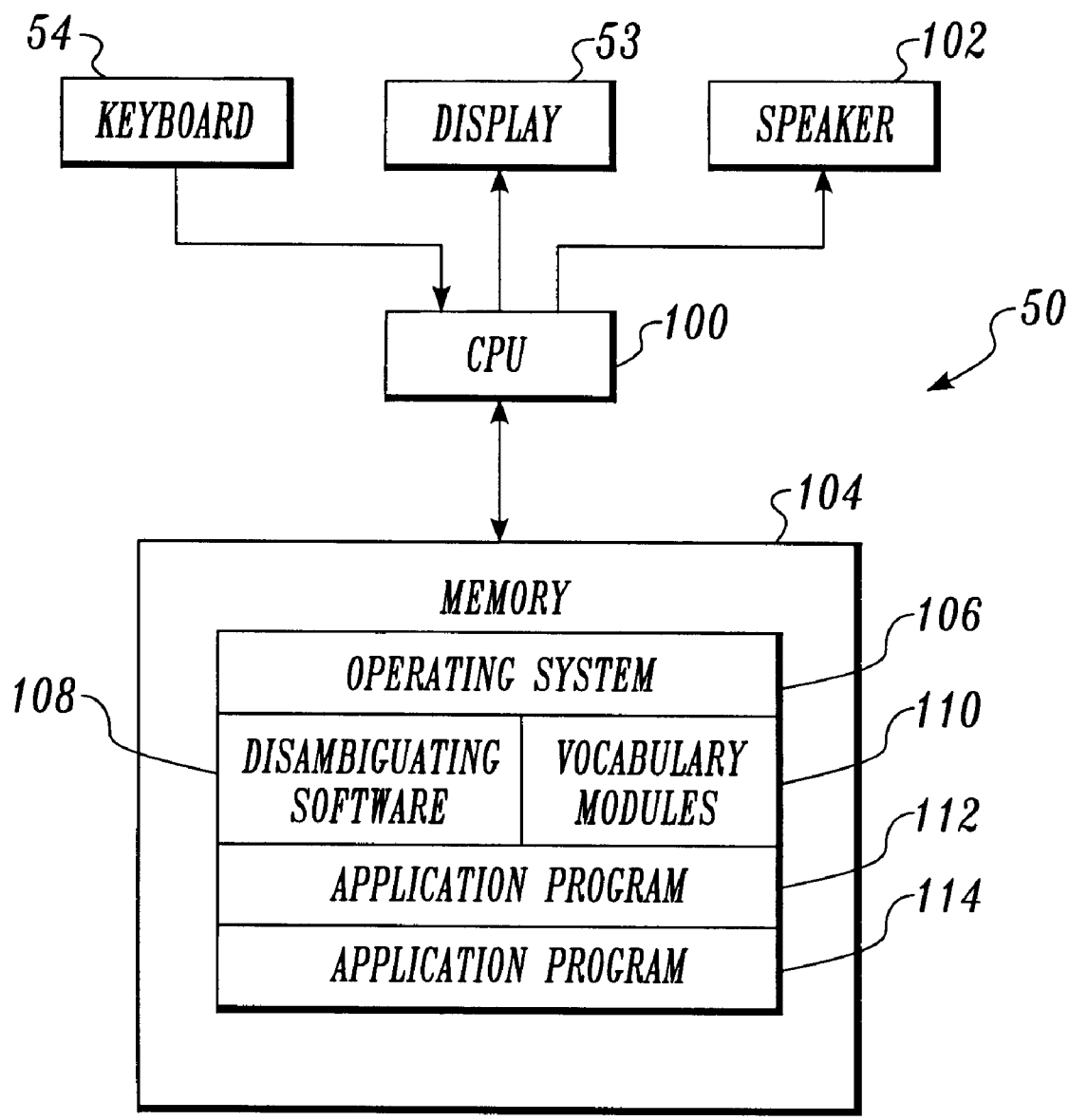
FIG. 2 is a hardware block diagram of the reduced keyboard disambiguating system of FIG. 1.

A block diagram of the reduced keyboard disambiguating system hardware is provided in FIG. 2. The keyboard 54 and the display 53 are coupled to a processor 100 through appropriate interfacing circuitry. A speaker 102 is also coupled to the processor. The processor 100 receives input from the keyboard, and manages all output to the display and speaker. Processor 100 is coupled to a memory 104. The memory includes a combination of temporary storage media, such as random access memory (RAM), and permanent storage media, such as read-only memory (ROM), floppy disks, hard disks, or CD-ROMs. Memory 104 contains all software routines to govern system operation. Preferably, the memory contains an operating system 106, disambiguating software 108, and associated vocabulary modules 110 that are discussed in additional detail below. Optionally, the memory may contain one or more application programs 112, 114. Examples of application programs include word processors, software dictionaries, and foreign language translators. Speech synthesis software may also be provided as an application program, allowing the reduced keyboard disambiguating system to function as a communication aid.

Returning to FIGS. 1A and 1B, the reduced keyboard disambiguating system 50 allows a user to quickly enter text or other data using only a single hand. Data is entered using the data keys 56. Each of the data keys has multiple meanings, represented on the top of the key by multiple letters, numbers, and other symbols. (For the purposes of this disclosure, each data key will be identified by the symbols in the center row of the data key, e.g., "RPQ" to identify the upper left data key.) Since individual keys have multiple meanings, keystroke sequences are ambiguous as to their meaning. As the user enters data, the various keystroke interpretations are therefore displayed in multiple regions on the display to aid the user in resolving any ambiguity. A selection list 76 of possible interpretations of the entered keystrokes is provided to the user in the selection list region 70. The first entry 78 in the selection list is selected as a default interpretation and displayed in the text region 66 at an insertion point 88.

The selection list 76 of the possible interpretations of the entered keystrokes may be ordered in a number of ways. In a normal mode of operation, the keystrokes are initially interpreted as the entry of letters to spell a word (hereinafter the "word interpretation"). Entries 78 and 80 in the selection list are therefore words that correspond to the entered keystroke sequence, with the entries ordered so that the most common word corresponding to the keystroke sequence is listed first. For example, as shown in FIG. 1A, a keystroke sequence ADF, OLX, NBZ and EWV has been entered by a user. As keys are entered, a vocabulary module look-up is simultaneously performed to locate words that have matching keystroke sequences. The words identified from the vocabulary module are displayed to the user in the selection list 76. The words are sorted according to frequency of use, with the most commonly used word listed first. Using the example keystroke sequence, the words "done" and "doze" were identified from the vocabulary module as being the most probable words corresponding to the keystroke sequence. Of the two identified words, "done" is more frequently used than "doze," so it is listed first in the selection list. The first word is also taken as the default interpretation and provisionally posted as highlighted text at the insertion point 88.

Following entry of the keystroke sequence corresponding to the desired word, the user presses the select key 60. Pressing the select key draws a box around the first entry in the selection list 76 and redisplays the first entry at the insertion point 88 with a box around the entry. If the first entry in the selection list is the desired interpretation of the keystroke sequence, the user continues to enter the next word using the data keys 56. The reduced keyboard disambiguating system interprets the start of the next word as an affirmation that the currently selected entry (in this case, the first entry in the selection list) is the desired entry. Alternatively, the selection of the first entry may occur after a user-programmable time delay. The default word therefore remains at the insertion point as the choice of the user, and is redisplayed in normal text without special formatting.

If the first entry in the selection list is not the desired interpretation of the keystroke sequence, the user may step through the items in the selection list by repeatedly pressing the select key 60. For each press of the select key, the next entry in the selection list is boxed, and a copy of the entry provisionally copied to the insertion point and boxed. Provisionally posting the next entry to the text region allows the user to maintain their attention on the text region without having to refer to the selection list. If the second entry in the selection list is the desired word, the user proceeds to enter the next word after two presses of the select key and the disambiguating system automatically posts the second entry to the text region as normal text. If the second entry is not the desired word, the user may examine the selection list and press the select key a desired number of times to select the desired entry before proceeding to enter the next word. When the end of the selection list is reached, additional presses of the select key causes the selection list to scroll and new entries to be added to the end of the selection list. Those entries at the top of the selection list are removed from the list displayed to the user. The entry selected by multiple presses of the select key is automatically posted to the text region when the user presses any data key 56 to continue to enter text.

In the majority of text entry, keystroke sequences are intended by the user as letters forming a word. It will be appreciated, however, that the multiple characters and symbols on the keys allow the individual keystrokes and keystroke sequences to have several interpretations. In the preferred reduced keyboard disambiguating system, various different interpretations are automatically determined and displayed to the user at the same time as the keystroke sequence is interpreted and displayed to the user as a list of words.

For example, the keystroke sequence is interpreted as word stems representing all possible valid sequences of letters that a user may be entering (hereinafter the "stem interpretation"). Unlike word interpretations, word stems are incomplete words. When stem interpretations are displayed as part of the selection list 76, the stem interpretations in the selection list are therefore not selectable by pressing the select key. By indicating the last keystrokes, however, the word stems allow the user to easily resume typing when his or her attention has been diverted in the middle of the word. As shown in FIG. 1A, the keystroke sequence ADF OLX NBZ EWV has been interpreted as forming a valid stem "albe" (leading to the word "albeit"). The stem interpretation is therefore provided as entry 81 in the selection list. Preferably, the stem interpretations are sorted according to the frequency of the most probable words that can be generated from each stem. When listing a stem interpretation in the selection list, the stem is omitted if a stem interpretation duplicates a word that is shown in the selection list. When the stem is omitted, however, the word corresponding to the omitted stem is marked with a symbol to show that there are also words of longer length having this word as their stem. Stem interpretations provide feedback to the user by confirming that the correct keystrokes have been entered to lead to the entry of a desired word.

Each pair of keystrokes is also interpreted as specifying a single character using a two-stroke specification method (hereinafter the "two-stroke interpretation"). The data keys 56 contain up to nine characters that are arranged in a 3-by-3 array on the top of each key. The first keystroke in each two-stroke pair of keystrokes is ambiguous—it tells the system that the user wishes to choose one of the nine characters grouped on the depressed key, but it does not specify which character. The second keystroke qualifies or disambiguates the first. The position of the second keystroke in the 3-by-3 array of data keys specifies the character to be chosen from the 3-by-3 array of characters on the top of the first key. Each pair of keystrokes is therefore also interpreted by the reduced keyboard disambiguating system and automatically presented to the user in the selection list. For example, as shown in FIG. 1A, the entry of a keystroke sequence ADF and OLX first designates the top center data key, then the character on that key in the left position of the second row, namely, the letter "a". The next two keystrokes NBZ and EWV designate the top right data key, then the symbol in the center position of the second row, namely, the letter "b". The two-stroke interpretation "ab" is therefore provided as an entry 82 in the selection list. It will be appreciated that the two-stroke interpretation may also be reversed, with the first keystroke qualifying or disambiguating the second.

A second method is also employed in which a sequence of keystrokes is interpreted as unambiguously specifying a specific string of alphabetic characters (hereinafter the "multiple-stroke interpretation"). The data keys 56 contain up to three letters that are arranged in a the center row of the 3-by-3 array of characters on the top of each key. The letters are ordered from left to right on each keytop in order of decreasing frequency. That is, the most frequently occurring letter appears first. Each letter of a word may be unambiguously spelled by pressing the key on which the letter appears a number of times corresponding to the position of the desired letter in the row. Thus, the leftmost letter is specified by a single keypress, the center letter by two keypresses, and the rightmost letter by three keypresses. When two successive letters in a word appear on the same key, the user must pause for a minimum delay period between the keypresses for the two letters. In general, this delay may be set quite short since the double and triple keypresses for letters can be expected to occur quite rapidly. The present invention, by virtue of the assignment of letters to minimize ambiguity and the ordering of letters on each key according to letter frequency, requires on average less than 69% of the keystrokes that would be required using the same method on a standard Touch-Tone keypad. The multiple-stroke interpretation of each sequence of keystrokes is therefore also performed by the reduced keyboard disambiguating system and automatically presented to the user in the selection list. For example, as shown in FIG. 1A, the entry of the keystroke sequence ADF, OLX, NBZ, EWV first designates the character string "aone". The multiple-stroke interpretation "aone" is therefore provided as an entry 83 in the selection list. It will be appreciated that a given method for interpreting keystroke sequences may be easily enabled or disabled. For simplicity, the multiple-stroke interpretation is shown only in FIG. 1A, and is not shown in the other examples.

The keystroke sequence is also interpreted as a string of numerical digits (hereinafter the "numeric interpretation"). Data keys 56 contain characters representing numerical digits. One of the interpretations provided in the selection list is therefore the numerical digits that correspond to the keystroke sequence. For example, entry 84 is the numeric interpretation ("8495") of the keystroke sequence ADF, OLX, NBZ, EWV.

Finally, any keystroke sequence may be given additional meanings by linking the keystroke sequence to an object in a vocabulary module (discussed below). For example, as shown in the selection list in FIG. 1A, the keystroke sequence may be interpreted and presented as an entry 86 that corresponds to a system command or system menu. The system command "<cancel>" corresponds to a system macro object that cancels the current key sequence. Entry 86 may also correspond to a system menu. Selecting an entry labeled "<delete>", for example, may cause a number of menu items such as "delete file" or "delete paragraph" to be displayed in the selection list. The user would select the appropriate menu item by pressing the select key to box the desired item. Those skilled in the art will recognize that other system commands or system menus may also be defined in the system.

As noted above, in the normal mode of operation the entries in the selection list 76 corresponding to words are presented first in the list. In other circumstances, it may be desirable to have other keystroke sequence interpretations presented first in the list. For example, in situations where a series of numbers are to be entered, it would be desirable to have the numeric interpretation of the keystroke sequence presented first. The reduced keyboard disambiguating system therefore allows a user to select between other modes of operation by accessing a system menu. In a numeric mode of operation, the first interpretation provided in the selection list is the number corresponding to the keystroke sequence. In a two-stroke specification mode, the two-stroke interpretation is provided first in the selection list. The two-stroke specification mode therefore allows the user to enter a large number of words that must be spelled because they are not contained in the system vocabulary modules. Each of these modes of operation changes the ordering of the selection list displayed to the user.

Figure 3:
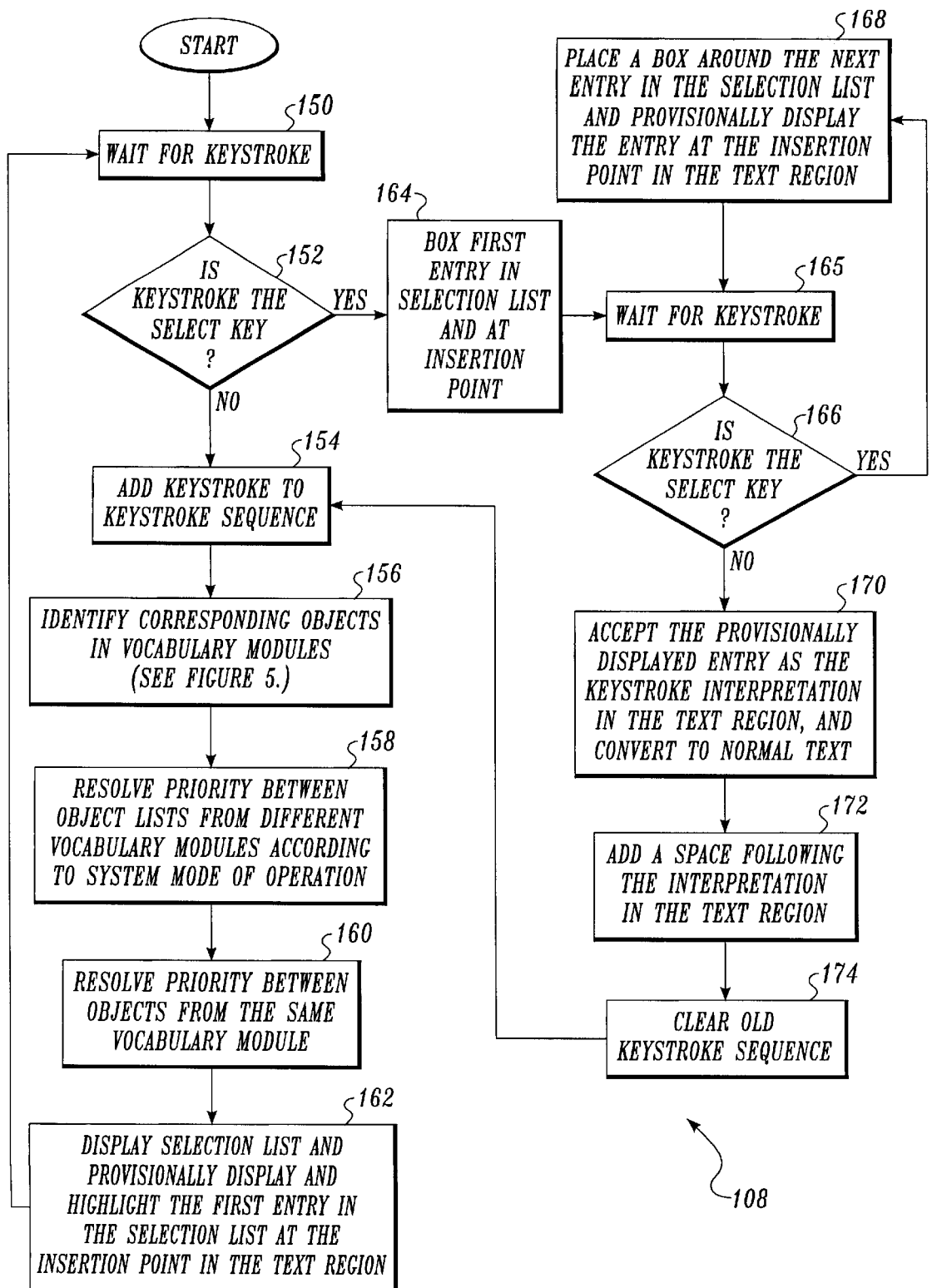
FIG. 3 is a flow chart of disambiguating software for the reduced keyboard disambiguating system of FIG. 1.

The operation of the reduced keyboard disambiguating system is governed by the disambiguation software 108. FIG. 3 is a flow chart of a main routine of the disambiguation software that generates a selection list to aid the user in disambiguating ambiguous keystroke sequences. At a block 150, the system waits to receive a keystroke from the keyboard 54. At a decision block 152, a test is made to determine if the received keystroke is the select key. If the keystroke is not the select key, at a block 154 the keystroke is added to a stored keystroke sequence. At a block 156, objects corresponding to the keystroke sequence are identified from the vocabulary modules in the system. Vocabulary modules are libraries of objects that are associated with keystroke sequences. An object is any piece of stored data that is to be retrieved based on the received keystroke sequence.

For example, objects within the vocabulary modules may include numbers, letters, words, stems, phrases, or system macros. Each of these objects is briefly described in the table below:

| Object | Corresponding data |
| --- | --- |
| Numbers | A number, each digit of which corresponds to a single keystroke, e.g., the four-digit sequence "8495". |
| Letters | A letter or sequence of letters corresponding to sequences of keystrokes, e.g., the two letter sequence "ab". Each sequence of keystrokes is disambiguated using the two-stroke specification method of inputting individual letters and using the multiple-stroke specification method. |
| Word | A word corresponding to single or multiple keystrokes, e.g., the four letter word "done". |
| Stem | A sequence of letters representing a valid portion of a longer sequence of letters forming a word, e.g., "albe" as a stem of the word "albeit." |
| Phrase | A user-defined or system-defined phrase corresponding to single or multiple keystrokes, e.g., "To Whom it May Concern:". |
| System Macro | A word and associated code describing a system or user-defined function, e.g., "<clear>" to perform the function of clearing the current text region. In addition to the descriptive word, in the vocabulary module the system macro object is associated with the executable code necessary for performing the specified function. |

While the preferred vocabulary objects are discussed above, it will be appreciated that other objects may be contemplated. For example, a graphic object may be associated with a stored graphic image, or a speech object may be associated with a stored segment of speech. A spelling object may also be envisioned that would link the keystroke sequence of commonly misspelled words and typing errors with the correct spelling of the word. For example, words that include the letter sequence "ie" or "ei" will appear in the list of words even if the keystrokes for these letters are reversed from their proper sequence. To simplify processing, each vocabulary module preferably contains similar objects. It will be appreciated, however, that various objects may be mixed within a vocabulary module.

Figure 4A:
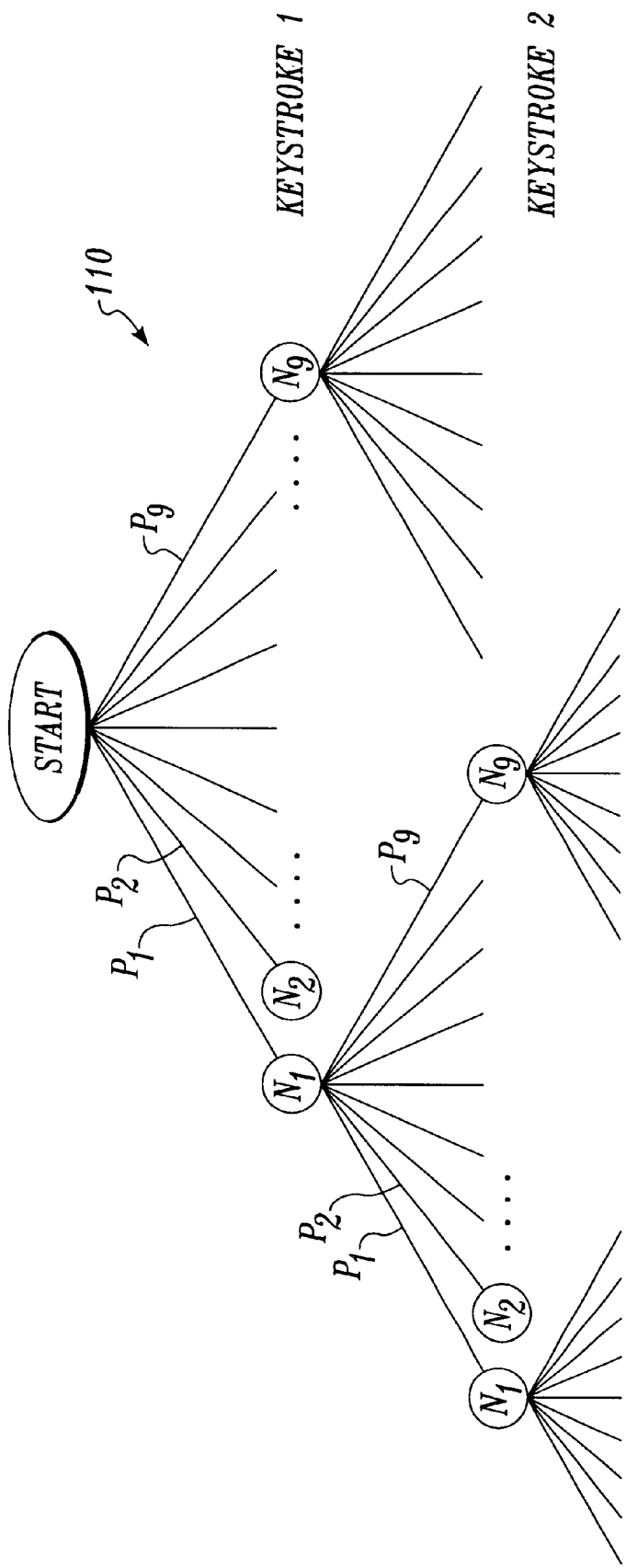
FIGS. 4A–4C are diagrams depicting the construction of a preferred vocabulary module and associated object lists for the reduced keyboard disambiguating system of FIG. 1.

A representative diagram of a vocabulary module 110 is depicted in FIG. 4A. A tree data structure is used to organize the objects in a vocabulary module based on a corresponding keystroke sequence. As shown in FIG. 4A, each node $N_1$, $N_2$, ... $N_9$ in the vocabulary module tree represents a particular keystroke sequence. The nodes in the tree are connected by paths $P_1$, $P_2$, ... $P_9$. Since there are nine ambiguous data keys in the preferred embodiment of the disambiguating system, each parent node in the vocabulary module tree may be connected with nine children nodes. Nodes connected by paths indicate valid keystroke sequences, while the lack of a path from a node indicates an invalid keystroke sequence.

The vocabulary module tree is traversed based on a received keystroke sequence. For example, pressing the first data key from the start block traverses path $P_1$ to node $N_1$. Pressing the ninth data key after pressing the first data key traverses path $P_9$ to node $N_9$. As will be described in greater detail below, each node is associated with a number of objects corresponding to the keystroke sequence. As each node is reached, an object list is generated of the objects corresponding to the keystroke sequence. The object list from each vocabulary module is used by the main routine of the disambiguating system to generate a selection list 76.

Figure 4B:
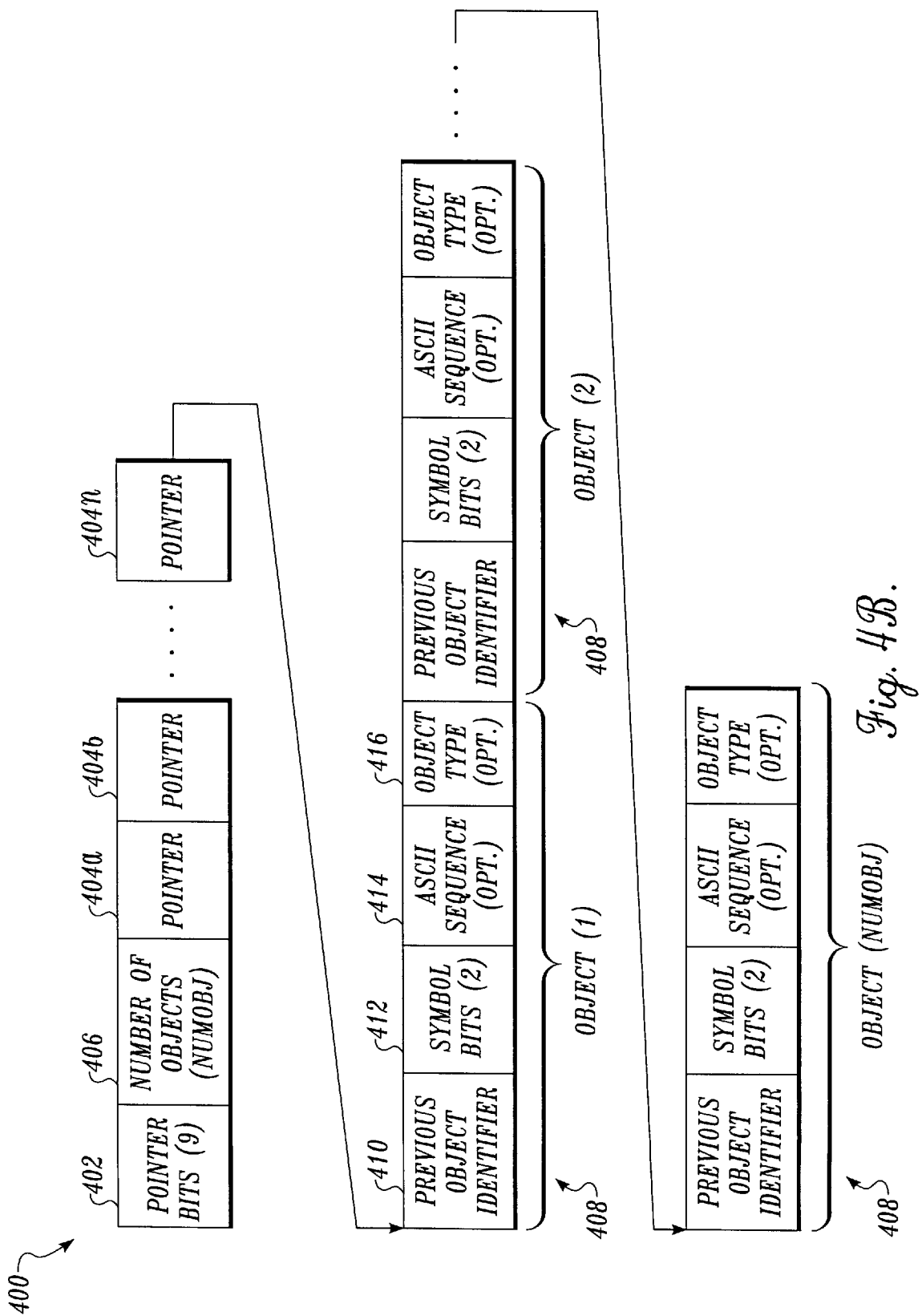

FIG. 4B is a block diagram of a preferred data structure 400 associated with each node. The data structure contains information that links each parent node to children nodes in the vocabulary module tree. The data structure also contains information to identify the objects associated with the particular keystroke sequence represented by the node.

The first field in the node data structure 400 is a pointer bits field 402 that indicates the number and identity of children nodes that are connected to the parent node. Since there are nine data keys, only nine children nodes may be connected to any parent node. In the preferred embodiment, nine pointer bits are therefore provided in the pointer bits field to indicate the presence of a child node. Each pointer bit is associated with a pointer field 404a, 404b, ... 404n that contains a pointer to the respective child node data structure in the vocabulary module. Since a child node is only present if the keystroke associated with the child node forms part of a valid keystroke sequence with the keystroke sequence associated with the parent node, the number of pointer fields varies for each node. For example, pointer bits field 402 may indicate that only six of the possible nine keystrokes lead to a valid child node. Because there are only six valid paths, only six pointer fields 404a, 404b, ... 404f are included in the data structure for the parent node. The pointer bits field 402 is used to ascertain the identity of the pointer fields contained within the node data structure. If a keystroke does not lead to a valid child node, the associated pointer field may be omitted from the node data structure in order to conserve the amount of memory space required to store the vocabulary module.

Associated with each node are a number of objects that correspond to the keystroke sequence represented by the node. For each node, a number of objects field 406 is provided to indicate the number of objects (NUMOBJ) associated with the node. Since each node is associated with one and only one keystroke sequence, the number of objects associated with any given node is a constant. Each of the objects is associated by an object packet 408 contained in the node data structure. The number of objects field 406 specifies the number of object packets 408 that are present in the node data structure.

Figure 4C:
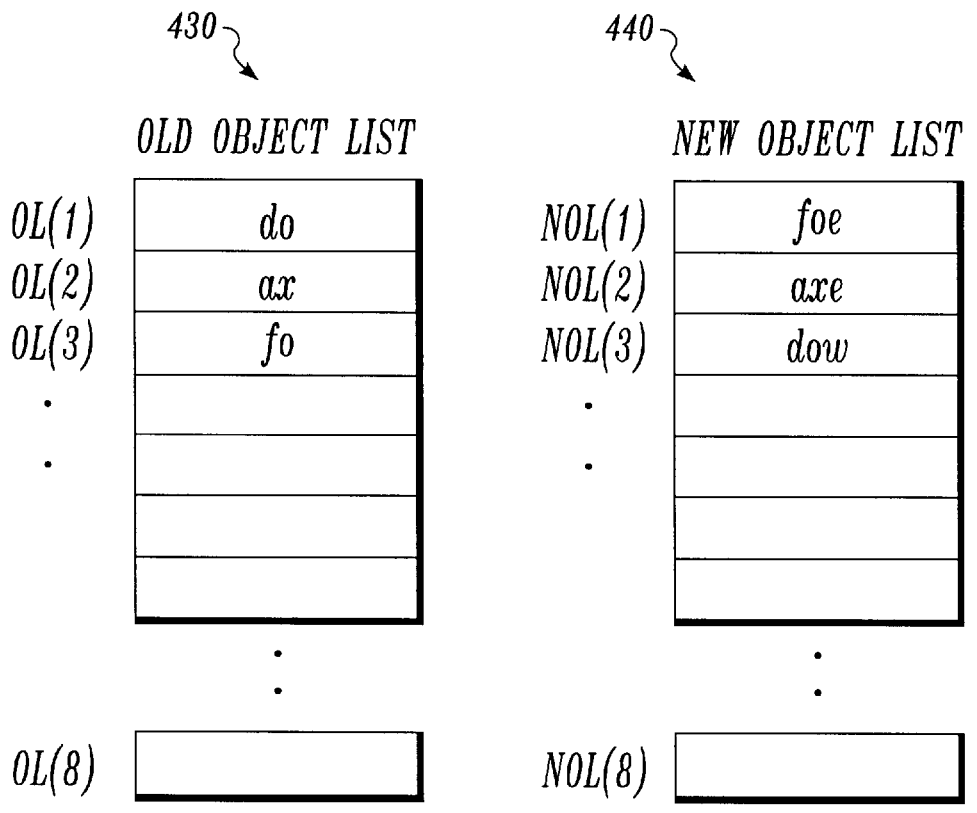

Each object packet 408 describes one object corresponding to the keystroke sequence represented by each node. Describing an object requires maintaining two object lists. FIG. 4C depicts representative object lists created for a parent and a child in a vocabulary module tree. Object list 430 is an object list containing objects OL(1)–OL(8) associated with a node representing two keystrokes. Object list 440 is an object list containing objects NOL(1)–NOL(8) associated with a node representing three keystrokes. Each object list contains a list of all objects that are associated with each node. Object list 430 is associated with a parent node representing the keystroke sequence ADF OLX. Object list 440 is associated with a child node representing the keystroke sequence ADF OLX EWV. Although a maximum of eight entries are depicted as capable of being stored in each object list, it will be appreciated that the size of the object list may be varied to account for the maximum number of objects associated with each node.

Each object associated with a child node is constructed by adding a character sequence onto an object that was constructed for the parent node. The object packet 408 therefore contains a previous object identifier field 410 that identifies from a parent node object list an object that is used to construct the child node object. For example, with reference to FIG. 4C, the third object "fo" in the old object list 430 is used to construct the first object "foe" in the new object list 440. The previous object identifier field 410 therefore provides a link to the entries in the old object list to identify the old object used to construct the new object.

The object packet 408 contains a two-bit symbol field 412 to indicate the symbol to add to the identified object in order to construct the new object. In the preferred embodiment, each ambiguous key contains a maximum of three letters. The symbol field bits therefore specify the letter from each key that is used to construct the new object using the following binary code: "00" corresponds to the first letter on the key, "01" corresponds to the second letter on the key, and "10" corresponds to the third letter on the key. For example, with reference to FIG. 4C, the first object "FOE" in the new object list 440 is constructed by using the third object "FO" in the old object list 430 and adding an additional keystroke to specify the E. In the preferred keyboard arrangement, "E" is the first letter on the EWV key, therefore the symbol field corresponding to the object "FOE" is set to "00" to indicate the first letter on the key. Encoding the objects in this manner greatly reduces the amount of storage space required for each vocabulary module. The encoding technique also allows direct access to vocabulary module entries without searching. Rather than having to store every object in the vocabulary module, a new object is defined using the two-bit code to add onto an old interpretation. The disclosed storage method requires, however, maintaining an object list from a parent in the vocabulary module tree in order to construct an object list of the child.

Symbol field 412 may also be set to the value "11". When set to the value "11", the symbol field indicates the presence of an ASCII sequence field 414 immediately following the symbol field. The ASCII sequence field is used to store strings of characters that are to be appended to the identified object. For example, the ASCII sequence field may store the string "rward" to be added to the third object "fo" from the old object list to form the word "forward". In this manner, the length of an entered keystroke sequence does not necessarily directly correspond to the length of an associated object. The ASCII sequence field allows a vocabulary object to be identified by an arbitrary key sequence, i.e., stored at an arbitrary location within the vocabulary module tree.

The capability of storing objects with an arbitrary keystroke sequence is used to speed system processing of abbreviations and contractions. Abbreviations and contractions are typically identified by a keystroke sequence that corresponds to their pure alphabetic content, ignoring punctuation. The result is that abbreviations and contractions are easily accessed by the user without entering punctuation, resulting in a significant savings in keystrokes. For example, the user can enter the keystroke sequence for "didnt" without adding an apostrophe between the "n" and the "t". The word in the vocabulary module that corresponds to the keystroke sequence "didnt" contains an ASCII sequence field with an apostrophe between the "n" and the "t". The disambiguating system will therefore automatically display to the user the correct word "didn't", without requiring the user to enter the punctuation mark. The disambiguating system uses the same technique to properly display foreign words having unique characters (such as "Ü", which may be entered as a "U"). Capitalization may be handled in a similar manner. Words that should always be used in all capital letters, with an initial capital letter, or with a capital letter in the middle are identified by keystroke sequences without keystrokes indicating capitals, eliminating the need for the user to enter such capitalization.

An object type field 416 may also be included in each object packet 408 to specify additional information about the object being constructed. The object type field may contain a code to specify whether the generated object is a word, a word stem, or any other object. The object type field therefore allows different types of objects to be mixed within a given vocabulary module. Moreover, the object type field may also include information regarding the part of speech of the word, information about how the object is capitalized, or information needed to construct various inflections and endings. A reduced keyboard disambiguating system using a vocabulary module having the part of speech information may use the additional information to implement syntactical analysis to improve the disambiguation process. The object type field may also contain a unique code to allow transmission of text in a compressed form. The unique code would be transmitted to a remote terminal instead of transmitting the entered keystroke sequence or the associated disambiguated characters.

One of the key features of the preferred vocabulary module tree data structure is that the objects associated with each node are stored in the node data structure 400 according to their frequency of use. That is, the first object packet 408 has a higher frequency of use than the second object packet in the node data structure, which has a higher frequency of use than the third object packet. In this manner, the objects are automatically placed in the object list so that they are sorted according to decreasing frequency of use. For purposes of this description, frequency of use refers to the likelihood of using a given word within a representative corpus of use, which is proportional to the number of times that each word occurs in the corpus.

While preferably the objects are stored within the node data structure 400 in order according to their frequency of use, it will be appreciated that a frequency of use field could also be associated with each object packet. The frequency of use field would contain a representative number that corresponds with the frequency of use of the associated object. The frequency of use between different objects would be determined by comparing the frequency of use field of each object. The advantage of using the latter construction that associates a frequency of use field with each object packet is that the frequency of use field could be changed by the disambiguating system. For example, the system could change a frequency of use field to reflect the frequency with which a user used certain objects within the vocabulary module during representative text entry.

Figure 5:
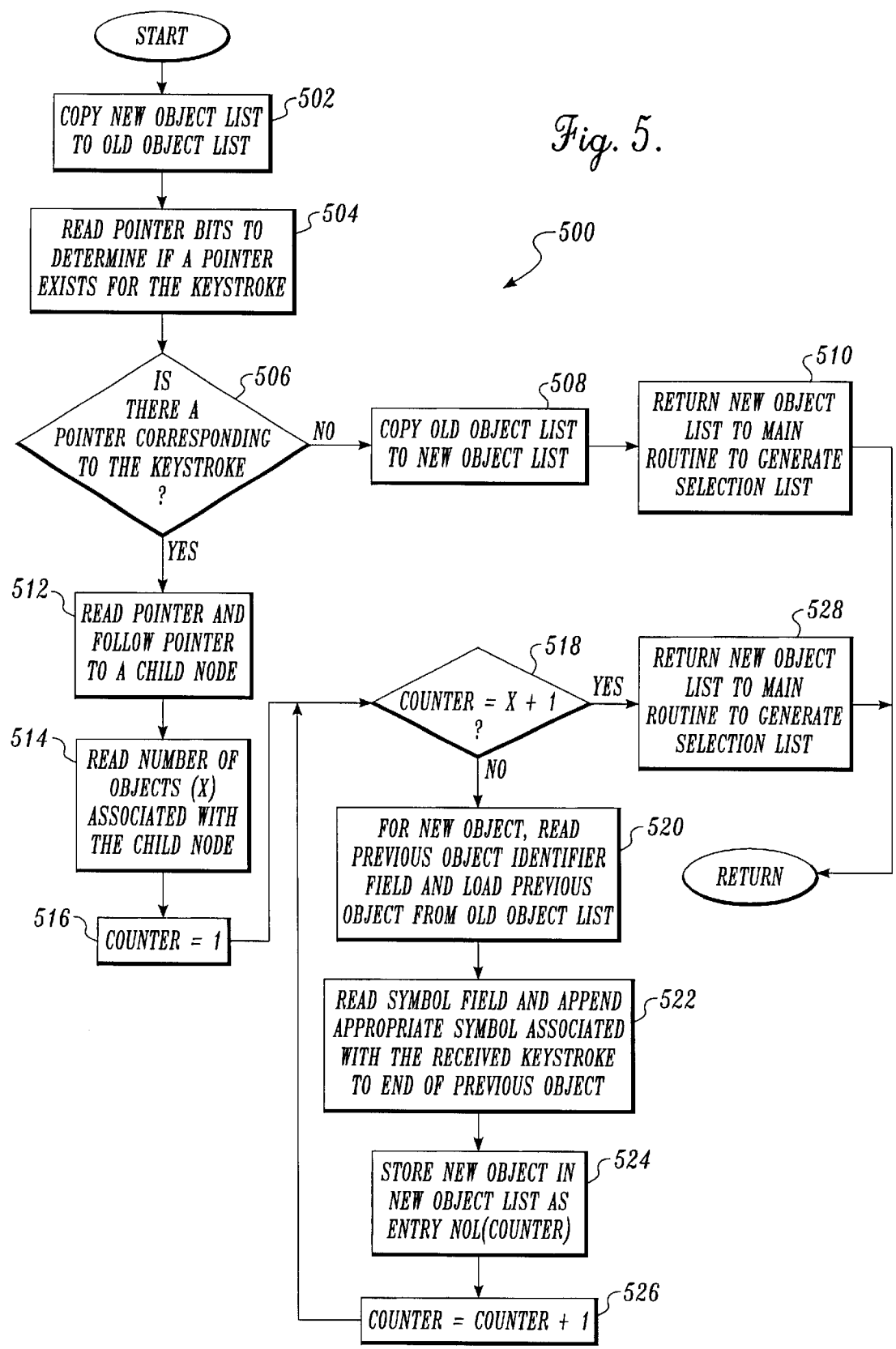
FIG. 5 is a flow chart of a subroutine for identifying objects contained in the vocabulary module depicted in FIG. 4 that correspond to a received keystroke sequence.

Returning to FIG. 3, at block 156 those objects that correspond to the received keystroke sequence are identified in each vocabulary module. FIG. 5 is a flow chart of a subroutine 500 for analyzing the received keystroke sequence to identify corresponding objects in a particular vocabulary module. The subroutine 500 constructs an object list for a node representing a particular keystroke sequence. As noted above, to construct a new object list the disambiguating system starts with a copy of the old object list. At a block 502, the object list from the prior node is therefore stored so that it may be used to construct the new object list.

In the main routine shown in FIG. 3, a keystroke was detected by the system at block 150. The receipt of a new keystroke causes a downward traversal in the vocabulary module tree, if a valid path exists to a child corresponding to the keystroke. At a block 504 in FIG. 5, the pointer bits field of the parent node data structure is therefore examined to determine if a pointer corresponds to the received keystroke. At a decision block 506, a test is made of the pointer bits field to determine if a pointer field 404a, 404b, . . . 404n exists that corresponds to the entered keystroke. If no pointer field corresponds to the keystroke, at a block 508 the old object list is copied to the new object list. At a block 510, the object list is returned to the main routine to generate the selection list. Since the received keystroke is part of an invalid keystroke sequence that does not correspond to any object within the vocabulary module, the keystroke is ignored and the current object list is returned to the main routine as being the object list from the vocabulary module. The branch of the subroutine 500 that comprises blocks 508 and 510 therefore ignores any invalid keystroke sequences and returns the object list generated at the parent node for possible inclusion in the selection list generated by the disambiguating system.

If a pointer exists corresponding to the received keystroke at decision block 506, the subroutine proceeds to a block 512 where the pointer is followed to the child node representing the keystroke. When the child node is identified, a new object list corresponding to the node must be constructed. At a block 514, on identifying the child node, the number of objects associated with the node are determined from the number of objects field 406 in the child node data structure.

After determining the number of objects to be generated at the child node, the subroutine enters the loop comprised of blocks 516 through 526 to reconstruct the object list associated with the child node. At a block 516, a counter is initially set to one. At a block 518, a test is made to determine if the counter has exceeded the number of objects associated with the node. If the counter has not exceeded the number of objects associated with the node, at a block 520 the previous object identifier field 410 is examined and the corresponding object loaded from the old object list. At a block 522, the symbol field 412 is examined and the appropriate symbol associated with the received keystroke appended to the end of the identified object. It will be appreciated that an additional ASCII sequence may also be appended to the identified object at block 522 if the symbol field indicates the presence of an ASCII sequence field 414 in the node data structure. At a block 524, the combined object and symbol are stored as a new object in the new object list. After storing the new object in the object list, at a block 526 the counter is incremented by one. The subroutine then loops to decision block 518 to determine whether all of the objects associated with the node have been constructed.

If the test at decision block 518 indicates that all of the objects have been constructed for the node, the subroutine proceeds to a block 528 where the new object list is returned to the main routine in order to generate the selection list. It will be appreciated that the subroutine 500 for generating the object list associated with each node is performed for each keystroke received from the user. No "searching" of the vocabulary modules is performed as the user enters a new keystroke sequence, since each keystroke merely advances the subroutine one additional level within the vocabulary module tree. Since a search is not performed for each keystroke, the vocabulary module returns the list of objects associated with each node in a minimal period of time.

It will be appreciated that the relationship between vocabulary module objects and keystroke sequences is an implementation detail of the vocabulary module. If only a limited number of objects (i.e., fewer than a predetermined number) are associated with a particular node, additional nodes may be traversed to identify objects having a keystroke sequence starting with the entered keystroke sequence. The objects are identified by traversing downward in the vocabulary module tree along valid paths until the objects are identified. The objects are then placed in the selection list before all the keystrokes corresponding to the objects are entered. The objects are included in addition to the objects that are directly associated with the input keystroke sequence. Displaying objects associated with longer keystroke sequences in the selection list (hereinafter referred to as the "look-ahead" feature) allows the user to optionally select the objects immediately, without having to complete the remaining keystrokes to specify the object. The look-ahead feature is enabled when the number of objects identified in the vocabulary modules fails to fill the selection list region 70 on the display.

Returning to FIG. 3, at blocks 158–162 the objects returned from the search of the vocabulary modules are prioritized and displayed to the user in the selection list 76. To determine the sequence of objects displayed in the selection list, priorities are established between each vocabulary module and also between the returned objects from each vocabulary module.

To prioritize the object lists identified from the various vocabulary modules, at block 158 the mode of operation of the reduced keyboard disambiguating system is examined. As discussed above, in a normal mode of operation the word interpretations are displayed first in the selection list. The object list from a word vocabulary module would therefore be assigned a higher priority than the object list from the other vocabulary modules. Conversely, if the disambiguating system is in the numeric mode of operation, the numeric interpretations would be assigned a higher priority than the other vocabulary modules. The mode of the disambiguating system therefore dictates the priority between vocabulary module object lists. It will be appreciated that in certain modes, the object lists from vocabulary modules may be omitted from the selection list entirely.

Object lists generated from vocabulary modules may contain only a single entry, or they may contain multiple entries. At block 160, the priority between the objects from the same vocabulary module is therefore resolved if the object list contains multiple entries. Within the search results from each vocabulary module, the objects that match a particular keystroke sequence are also given a priority that determines their relative presentation with respect to each other. As noted above, preferably the default presentation order is by decreasing frequency of use in a representative corpus of usage. The priority data associated with each object is therefore used to order the objects located in the search in the selection list. Since the selection list region 70 is limited in the number of entries that may be displayed, objects located by the search that fall below a predetermined minimum frequency of use may be omitted from the initial display of the selection list. The omitted objects may be later added to the selection list when the user scrolls beyond the end of the displayed list.

Many of the properties associated with the presentation of the vocabulary module search results are user-programmable by accessing appropriate system menus. For example, the user can specify the order of individual objects or classes of objects in the selection list region. The user may also set the priority level that determines the priority between vocabulary modules and between the objects identified from each vocabulary module. In this manner, the number of entries presented to the user in the selection list region may be kept to a minimum. Additional entries in the selection list region may always be scrolled into view by repeated presses of the select key.

After the priorities between the objects have been resolved, at a block 162 a selection list is constructed from the identified objects and presented to the user. As a default interpretation of the ambiguous keystroke sequence entered by the user, the first entry in the selection list is provisionally posted and highlighted at the insertion point 88 in the text region 66. The disambiguating software routine then returns to block 150 to wait for the next keystroke.

If the detected keystroke is a select key, the "yes" branch is taken from decision block 152 to a block 164. At a block 164, a box is placed around the first entry in the selection list, and at the insertion point where it has been provisionally posted. At a block 165, the system then waits to detect the next keystroke entered by the user. At a decision block 166, a test is made to determine if the next keystroke is the select key. If the next keystroke is the select key, at a block 168 a box is placed around the next entry in the selection list and the entry is provisionally displayed at the insertion point with a box around the entry. The routine then returns to block 164 to detect the next keystroke entered by the user. It will be appreciated that the loop formed by blocks 164–168 allows the user to select various interpretations of the entered ambiguous keystroke sequence having a lesser frequency of use by depressing the select key multiple times.

If the next keystroke is not the select key, from decision block 166 the routine continues to a block 170 where the provisionally displayed entry is selected as the keystroke sequence interpretation and is converted to normal text formatting in the text region. At a block 172, a space is added following the selected interpretation, since the receipt of an ambiguous keystroke following the select key indicates to the system the start of a new ambiguous sequence. At a block 174, the old keystroke sequence is cleared from the system memory. The newly received keystroke is then used to start the new keystroke sequence at block 154. Because the word interpretation having the highest frequency of use is always presented as the default choice, the main routine of the disambiguation software allows a user to continuously enter text with a minimum number of instances where additional activations of the select key are required.

Ambiguities are further reduced in the reduced keyboard disambiguating system by assigning the letters on the keys to minimize the number of ambiguities that occur during text entry. For example, with the keyboard letter arrangement depicted in FIG. 1, the desired word appears at the top of the selection list more than 99% of the time. For simple text, the reduced keyboard disambiguating system therefore typically requires less than one additional keystroke per hundred words typed. Such results are a great improvement over prior art methods of resolving reduced keyboard ambiguity, and make the reduced keyboard disambiguating system suitable for use in many text-entry applications.

II. Advanced System Features

1. Visual and Auditory Feedback

In FIG. 1A, information about the state of the reduced keyboard disambiguating system 50 is provided to the user using various types of visual and auditory feedback. Entries in the selection list 76 are presented in different colors depending on the interpretation of the keystroke sequence. For example, the word interpretation may be one color, the two-stroke interpretation another color, and the numeric interpretation a third color. A user may therefore easily scan the selection list for the desired interpretation.

During system use, the disambiguating system also indicates to the user which data keys 56 in the keyboard may constitute the next key in a valid word interpretation. As the number of keystrokes entered in a given keystroke sequence increases, the number of data keys that may be entered as the next key to form a word contained in the system vocabularies begins to decrease. Two techniques can be used to show the user which data keys may validly be used as the next keystroke when forming a word. First, a visual indication may be provided on the data keys themselves. If the data keys are typewriter-style keys, light-emitting diodes (LEDs) may be incorporated on the tops of each data key. The LEDs are lit when the data key is available for entry as the next keystroke to form a viable word interpretation. Multiple LEDs may also be incorporated on each key to indicate the specific letters that are valid on each key. Second, a separate display may be provided to the user that corresponds to the shape of the keyboard. For example, a three-by-three grid of LEDs may be presented to the user adjacent to the keyboard, each LED corresponding to one of the data keys. Alternatively, a 3×3 grid may be displayed in the text region 66, with elements in the grid turned on or off to indicate valid data keys to form a word interpretation.

It will be appreciated that providing a visual indication to the user of which data keys may be entered to form a valid word does not prevent the user from using the other data keys on the keyboard. Especially when entering words or special punctuation that are not contained within the disambiguating system vocabularies, the user must be able to use all possible keys in order to enter a word using the two-stroke method.

Audible tones indicate the state of selection list 76 and provide feedback about keystrokes to allow system information to be conveyed independently of any visual feedback provided in the selection list. Distinct tones indicate when the selection list is empty, when it contains a single unique word, and when it contains multiple ambiguous words. Another tone indicates when the second or third entry in the selection list has a frequency of use above a preset threshold, or when the difference in frequency between the first and second word falls below a selected threshold. Still other tones distinguish the type of item being selected in the selection list as the select key is pressed. Separate tones are therefore used to distinguish words, numbers, proper nouns, phrases, system macros, etc. Distinct tones can also be assigned to each key to allow identification of mistakes in keystrokes. Finally, a unique tone is heard when the user presses a key that is unavailable for a word as described above.

Additional auditory feedback may be provided to the user by including a voice synthesizer as an application program 112, 114 in the disambiguating system. As a user enters keystrokes, the voice synthesizer announces the first entry in the selection list. To allow typing to proceed unimpeded, the first entry is announced after a slight delay. The user may also cause the first entry to be spoken immediately by pressing the select key. The auditory feedback provided by a voice synthesizer allows visually-impaired users to use the system without having to view the selection list.

2. Keying Techniques

The reduced keyboard disambiguating system 50 supports four keying techniques to perform system commands, access system menus, or enter special symbols including punctuation and diacritics. First, the disambiguating system supports latching keystrokes, performed by pressing and holding a key in the depressed position for a specified minimum time. The minimum time a key must be held before being latched is set by the user in a system menu. When the minimum time has elapsed, audible or visual feedback is provided to the user. For example, a clicking noise may be made when a key is depressed for a sufficient time for the key to latch. The latching of a key may be combined with a second keystroke and mapped to any disambiguating system command, menu, or symbol. For example, a short press of the delete key 64 causes the last keystroke to be deleted, while latching the delete key causes the disambiguating system to remap the data keys 56 so that the next data key keystroke implements a system delete command. One data key may be remapped to act as a "delete line," another data key as a "delete paragraph," and a third data key as a "delete document," and so on. After performing the system command, the data keys return to their unmapped states.

Second, the disambiguating system supports overlapping keystrokes, performed by pressing and holding a first key while a second key is pressed. For example, the user could press and hold the delete key 64 before pressing the ADF key in the data keys 56. A minimum delay is required between depressing and holding the first key and depressing and holding the second key to distinguish the overlapping keystroke from a chorded keystroke discussed below. The various overlapping keystroke combinations may be mapped to any disambiguating system command, menu, or symbol.

Third, the disambiguating system supports chorded keystrokes, performed by pressing two or more keys at approximately the same time and holding them for at least a minimum delay time. For example, the user could simultaneously press and hold the delete key 64 and the CYK key in the data keys 56. The two keys are considered to have been pressed simultaneously if the interval between the two key presses is shorter than a maximum delay time. Both the minimum delay time and the maximum delay time of the chorded keystrokes may be set by a user in a system menu. The various chorded keystroke combinations may be mapped to any disambiguating system command, menu, or symbol.

It will be appreciated that certain overlapping keystrokes or chorded keystrokes are physiologically easier to implement than others. For example, it is easier to enter chorded keystrokes using two keys in the same row. Overlapping and chorded keystrokes that are easier to implement are therefore assigned to more frequently used commands, menus, or symbols. It will also be appreciated that the unambiguous row of system keys 54 may also be used in latching, overlapped, or chorded combinations.

Fourth, the disambiguating system supports the mapping of single keys to any disambiguating system command, menu, or symbol. The English language only contains two one-letter words ("A" and "I") that must be presented as the first choice in the selection list when the respective single keys are pressed. Pressing any of the other data keys 56 that do not contain "A" or "I" can therefore be used to list a system command, a menu, or a symbol as the first item in the selection list.

It will be appreciated that while the four keying techniques discussed above are preferably implemented in the reduced keyboard disambiguating system, depending on the keyboard construction some of the keying techniques may not be available. For example, the use of certain types of keyboards to implement keyboard 54, such as touch screens or thin-film keyboards, may make it impossible to detect chorded, latching, or overlapped keystrokes.

3. Punctuating, Capitalizing, Spacing, and Executing

When entering text, the reduced keyboard disambiguating system 54 allows punctuation to be entered using several techniques. As shown in FIG. 1B, common punctuation marks are provided on the tops of the data keys 56. A user may therefore use the two-stroke method to specify when a punctuation mark is to be included in the text. Alternatively, a user may use the latching, overlapped, or mapping of single key methods discussed above to enter a punctuation mark. Other punctuation marks and symbols that are used less often are assigned a chorded keystroke sequence or are accessible from a system menu. When entering a letter having a diacritic, an appropriate keystroke indicating the type of diacritic mark is entered in the keystroke sequence either immediately before the letter containing the diacritic.

Many common words contain a punctuation mark, however, such as a hyphen, apostrophe, or diacritic. As discussed above in the description of the vocabulary modules, the user may enter the keystroke sequence that corresponds only to the letters of the word without regard to a punctuation mark during entry of common words containing a punctuation mark. All techniques for entering punctuation are simultaneously enabled during system operation.

The shift key 62 preferably operates in the following manner. Pressing the shift key causes the next data keystroke to be capitalized. Pressing the shift key multiple times cycles through various functions. A second shift keystroke acts as a "ctrl" key, a third shift keystroke operates as an "alt" key, and a fourth keystroke operates as a "caps lock" key. A fifth shift keystroke cancels the operation of the shift key, returning to an unshifted state.

When the first letter of the word is capitalized, the words in the selection list 76 are optionally ordered to show proper nouns listed first in the list of interpretations. The words are sorted according to frequency of use, with the most commonly used proper nouns listed first. The frequency of occurrence of the proper nouns may be prestored in a vocabulary module, programmed by the user via a system menu, or adaptively calculated as the user continues to use the system as discussed below. The display of proper nouns first in the selection list is disabled or a warning is sounded when the capitalized word is the first word in a sentence.

4. Editing

Figure 6:
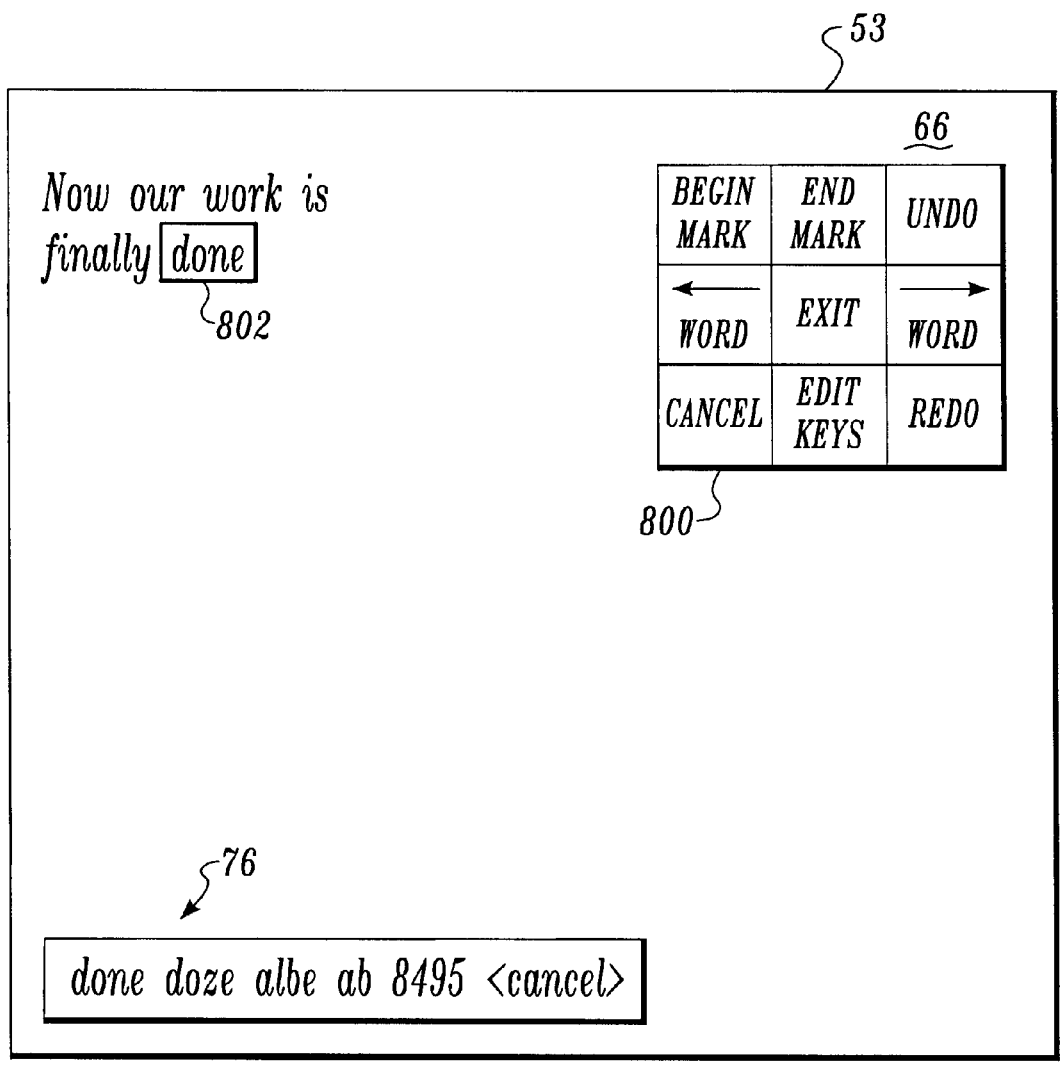
FIG. 6 depicts the display of the preferred embodiment of the reduced keyboard disambiguating system of the present invention wherein a key map for editing is displayed on the display.
Figure 7:
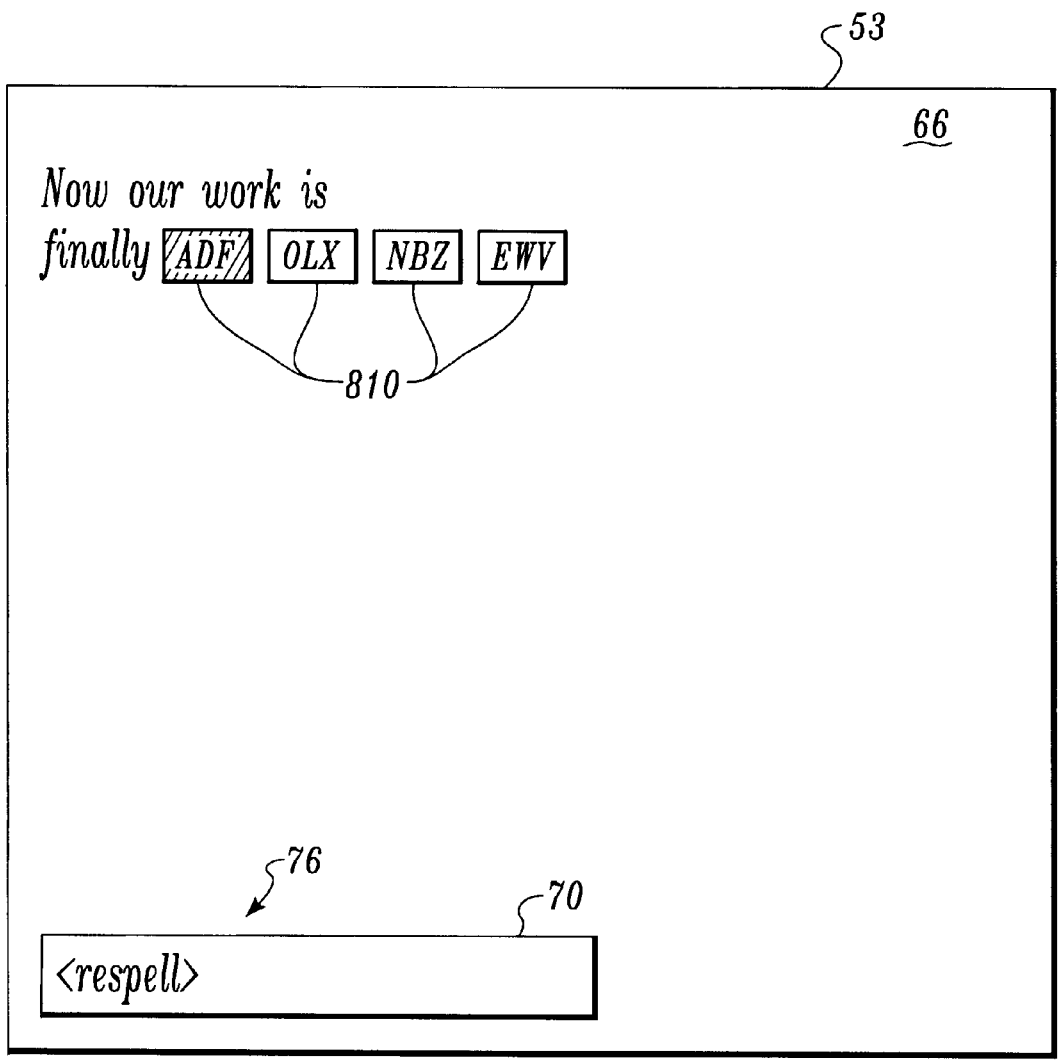
FIG. 7 depicts the display of the preferred embodiment of the reduced keyboard disambiguating system of the present invention wherein a respell mode has been entered by a user.

A user of the reduced keyboard disambiguating system 50 may enter an editing mode via an overlapped keystroke sequence. FIG. 6 depicts the display 53 of the computer while in editing mode. On entering the editing mode, a key map 800 indicating the remapped data key functions is displayed to the user in the text region 66. Each box in the key map indicates the editing command that will result if the corresponding data key is pressed.

Editing is performed on a word-by-word basis. Once in the edit mode, the user selects a word to edit by moving a cursor 802 to highlight the word. The user selects a word to edit by using the data keys corresponding to the commands "<--word" and "word-->" to move through the text displayed in the text region. Selecting a word in the text region recreates the same selection list 76 that was presented to the user at the time the edited word was added to the text region 66. To recreate the original selection list, the most efficient key sequence that would produce a given word is reconstructed from the word itself. The keystroke sequence is then interpreted using the vocabulary modules to reconstruct the environment (i.e., the contents of the selection list) from which the original word was selected.

Once a word is selected and the selection list redisplayed, the user has several different options for editing the word. One option allows the user to select a different word from the displayed selection list by appropriately pressing the select key. Multiple presses of the select key move down the selection list, in the same manner in which the edited word was originally selected. Pressing the delete key moves up the interpretation list. The boxed word from the selection list is automatically added to the text region when the user leaves the editing mode. After any word is selected in editing mode, additional text typed is inserted after the word at the point being edited in the text region.

Editing of a particular word is completed by selection of an appropriate word from the selection list. When the editing of a word is complete, the user can use the "<--word" and "word-->" keys to move through the text string displayed in the text region and select a different word for editing. When editing of the text is complete, the user exits the editing mode using the "exit" key.

5. "Respell" Mode

A second editing option is a "respell" mode, which allows the user to disambiguate an ambiguous keystroke sequence on a letter by letter basis. The respell mode is used when a user types a word that is not in the system vocabulary using only a single keystroke for each letter. Finding no words in the vocabulary module matching the keystrokes, the user may then enter the respell mode using an overlapped keystroke, and disambiguate each letter. The respell method of entering an unknown word in this manner is similar to the two-stroke method except the disambiguating process follows entry of the entire word, rather than after each letter of the word.

On receipt of the overlapped keystroke that designates respell mode, the preceding sequence of ambiguous keystrokes is displayed as a series of key icons, each key icon depicting the originally entered keystroke. A representative display is shown in FIG. 8, with four key icons 810 appearing for the original key sequence ADF, OLX, NBZ, EWV. The first key icon in the word is highlighted in the text region 66. For each key icon, the user presses a disambiguating key whose position in the middle row of data keys 56 corresponds to the position of the desired letter in the highlighted icon. The key used to disambiguate the keystroke is the same key that is used as the second key when entering letters using the two-stroke method. On receipt of each disambiguating keystroke, the highlighted icon is replaced by the selected letter, and the next icon in the sequence is highlighted. The disambiguated character sequence also appears in the selection list. Respell mode is terminated when the last keystroke icon is disambiguated, when the select key is pressed, or by the same overlapped keystroke that initiates respell mode.

6. Shortcuts

The reduced keyboard disambiguating system 50 incorporates several shortcuts that speed entry of text into the system. One shortcut causes the entry of an unambiguous symbol or an unambiguous function to delimit a current ambiguous sequence, if there is one, and automatically select and accept the first entry in the selection list 76. For example, a user that enters the ambiguous sequence CYK ADF NBZ, followed by an explicit (e.g., by overlapped keystroke) apostrophe ('), will have the system automatically select and post to the text region the word "can", since "can" is the first (i.e. most likely) interpretation of the key sequence CYK ADF NBZ. When a keystroke sequence is automatically interpreted in this manner, no space is generated following the selected interpretation. The user may therefore continue to enter the word by adding additional characters. This shortcut is typically used when punctuation marks are used in a keystroke sequence.

In addition to operating in different modes of operation wherein the selection list 76 is ordered to present a selected type of keystroke interpretation as the first entry in the list, the reduced keyboard disambiguating system 50 also may enter via a system menu a number of dedicated modes wherein only one interpretation is made for each key and only one or no entries are displayed in the selection list. For example, in a dedicated numeric mode, each keystroke corresponds to the entry of a number. In a dedicated cursor movement mode, each of the outside circle of data keys corresponds to a cursor movement direction to allow a user to manipulate a cursor in an application program. Those skilled in the art will recognize that other dedicated operating modes may also be envisioned, such as a mouse emulation or Touch-Tone phone emulation. When operating in the dedicated modes, text or commands are directly implemented since there is no ambiguity in the entered keystrokes.

Another shortcut provided by the disambiguating system allows unambiguous keystroke to immediately select certain interpretations in the selection list 76. Preferably, if more than one entry of a particular interpretation is present, the entry in the selection list having the highest frequency of use is selected. The use of an unambiguous keystroke to select a desired interpretation eliminates having to step through an unpredictable number of other interpretations.

7. System Output

The disambiguated output from the reduced keyboard disambiguating system 50 system is generally provided to other application programs 112, 114 running on and sharing the resources of the disambiguating system. Text is therefore directly entered into the application program using the aid of a selection list, such as shown in the system of FIG. 1A.

In other instances, the target for output is an application program running on a separate platform. For example, a user may desire to transfer entered text to a remote terminal. Those skilled in the art will recognize that a PCMCIA card or modem card may be added to computer 52 to allow data transfer with other devices. Disambiguated text may be transferred after the entry of each word, or after an explicit "send" function accessed by the user via a system menu.

8. Custom Vocabularies

Among the vocabulary modules 110 contained in the reduced keyboard disambiguating system 50 is a custom vocabulary module. Words entered using the two-stroke or multiple-stroke methods are automatically stored by the disambiguating system in the custom vocabulary module. The words stored in the custom vocabulary module will thereafter be automatically displayed in the selection list when the user enters the shorter sequence of single (ambiguous) keys for these words.

In addition to adding words to the custom vocabulary module during normal text entry, words may also be added to a user's custom vocabulary module from a variety of other sources. For example, documents may be downloaded into the disambiguating system and parsed to identify proper nouns or other words that are not contained in the vocabulary modules present in the disambiguating system. After parsing, the newly identified proper nouns and words are added to the user's custom vocabulary module. Custom vocabulary modules may also be uploaded or downloaded to other disambiguating systems or to a mass storage medium. A user may therefore merge their present custom vocabularies with other vocabularies created by another user.

The words in the selection list 76 identified from the standard vocabulary modules are preferably always presented to the user in the same order, according to decreasing frequency of use, so that the user can commit to memory the keystrokes necessary to enter a desired word.

III. Representative System Operation

Figure 8A:
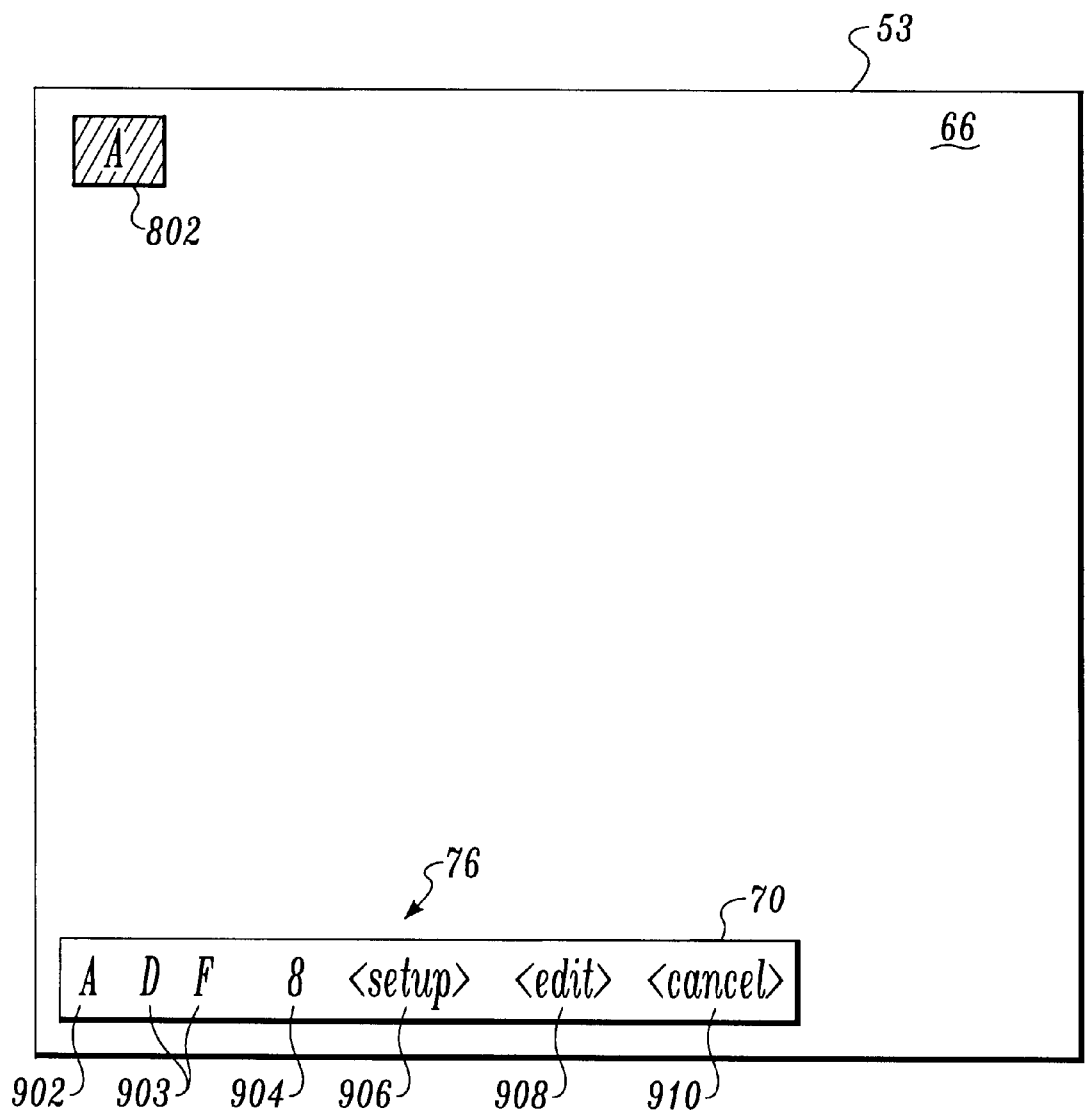

FIGS. 8A through 8J depict the display 53 of the portable computer 52 during a representative use of the reduced keyboard disambiguating system. After turning on the power of the portable computer, the text region 66 and selection list region 70 are empty. In FIG. 8A the user has pressed the ADF key. The word vocabulary module has interpreted the ADF key as the word "A" 902 and placed the interpretation, capitalized, in the selection list 76. The stem vocabulary module has interpreted the ADF as the stems "D" and "F" 903, and placed the interpretation in the selection list. The numeric vocabulary module has interpreted the keystroke as the number "8"904. The system command vocabulary module has matched the keystroke sequence with three system commands, "<Setup>" 906, "<Edit>" 908, and "<Cancel>" 910, and added the system commands to the selection list. The first entry in the selection list has also been provisionally posted and highlighted in the text region at insertion point 88.

Figure 8B:
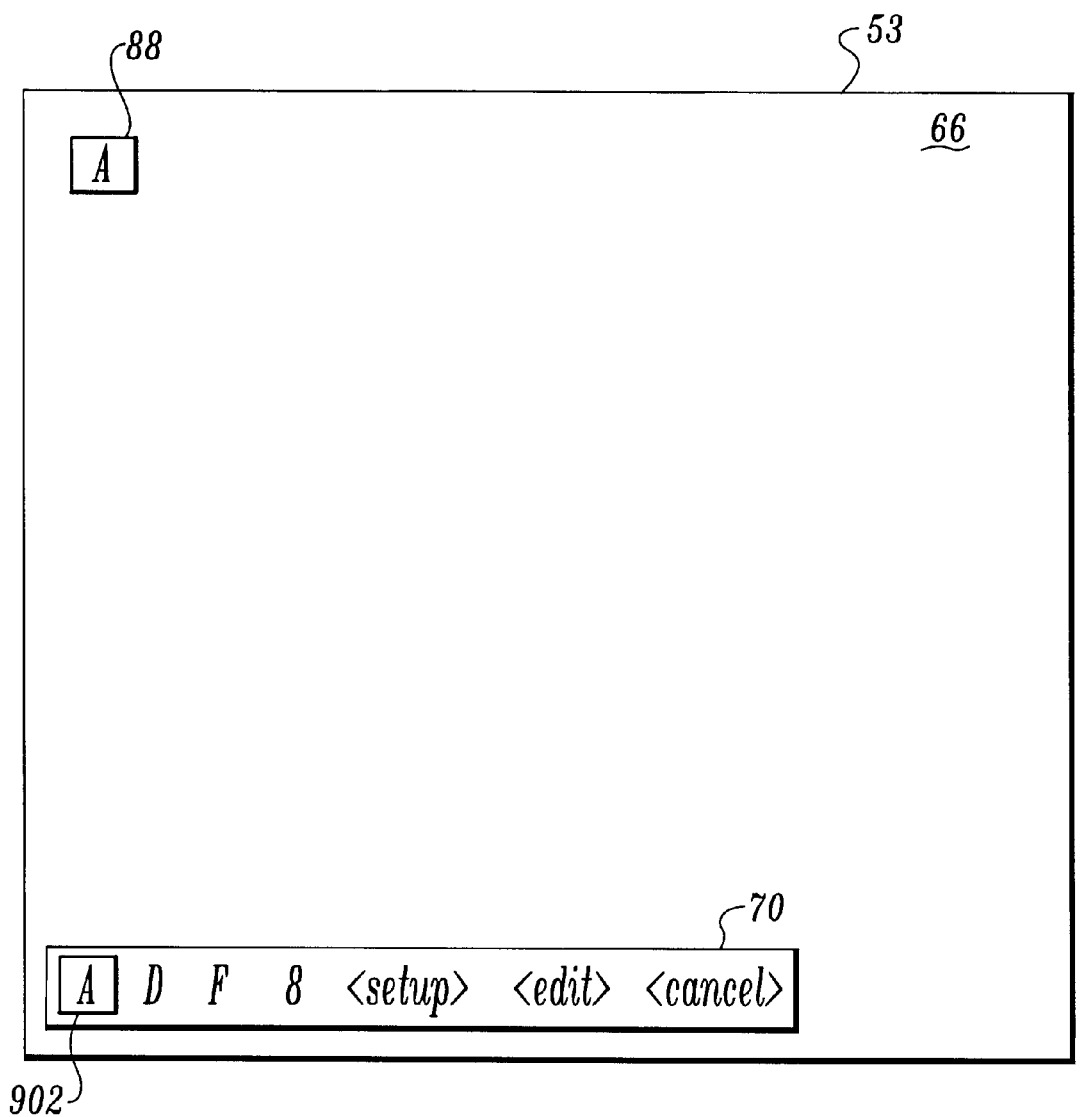

In FIG. 8B the user has pressed the select key 60, selecting and boxing the word "A" 902 in the selection list. The copy of the word that had been provisionally posted at the insertion point 88 becomes boxed, rather than highlighted, to indicate that the interpretation will be the selected interpretation if the user continues to enter text with an ambiguous keystroke.

Figure 8C:
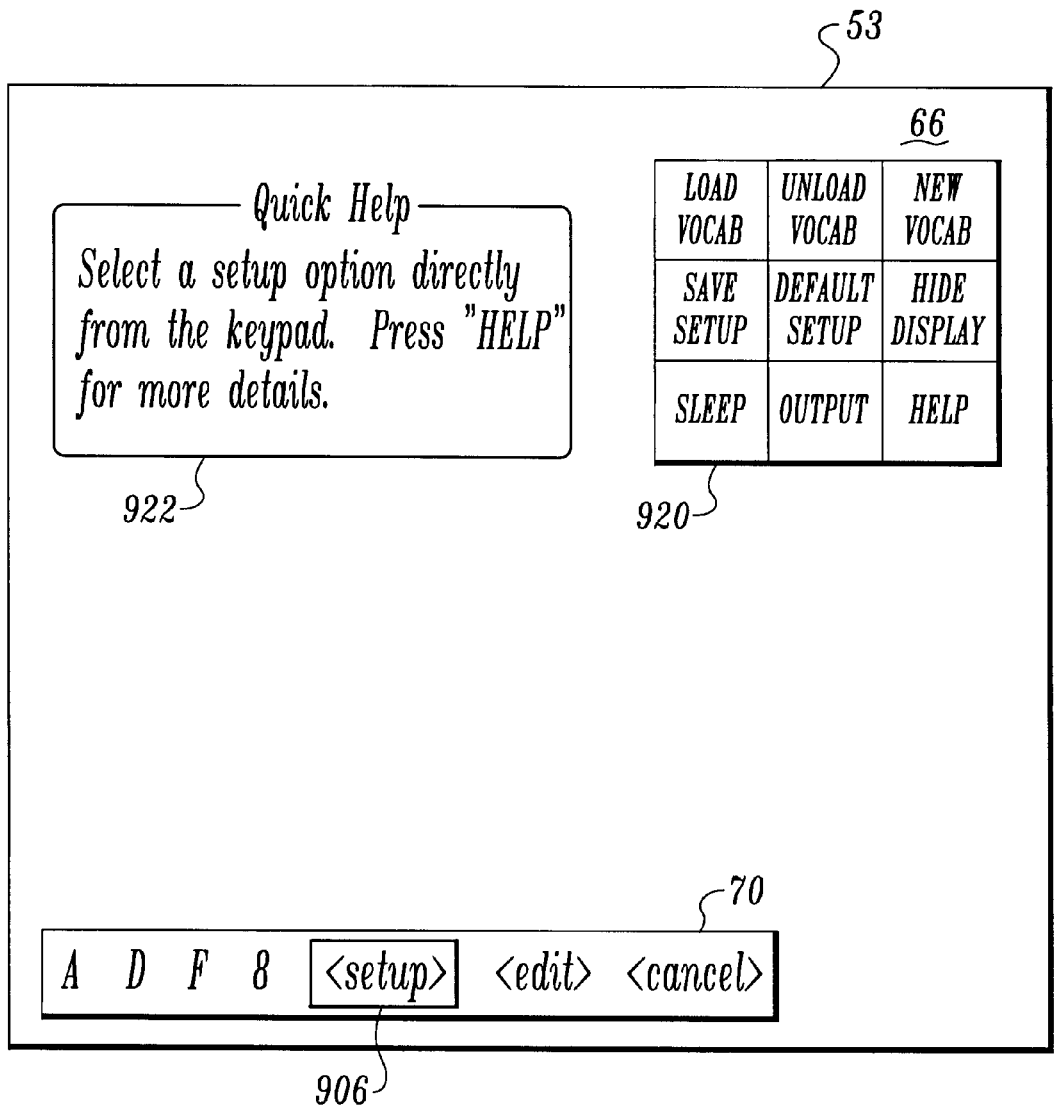

In FIG. 8C the user has pressed the select key 60 four additional times, boxing the system command "<Setup>" 906 in the selection list. When the <Setup> command is boxed, a 3×3 key map 920 is displayed in the upper right corner of the text region 66. Each square in the 3×3 key map directly corresponds with one of the data keys 56 in the keyboard. Pressing the center data key, for example, causes the reduced keyboard disambiguating system to perform the system command "Default Setup." A help dialog box 922 is also displayed in the text region to provide further instructions to a user.

Figure 8D:
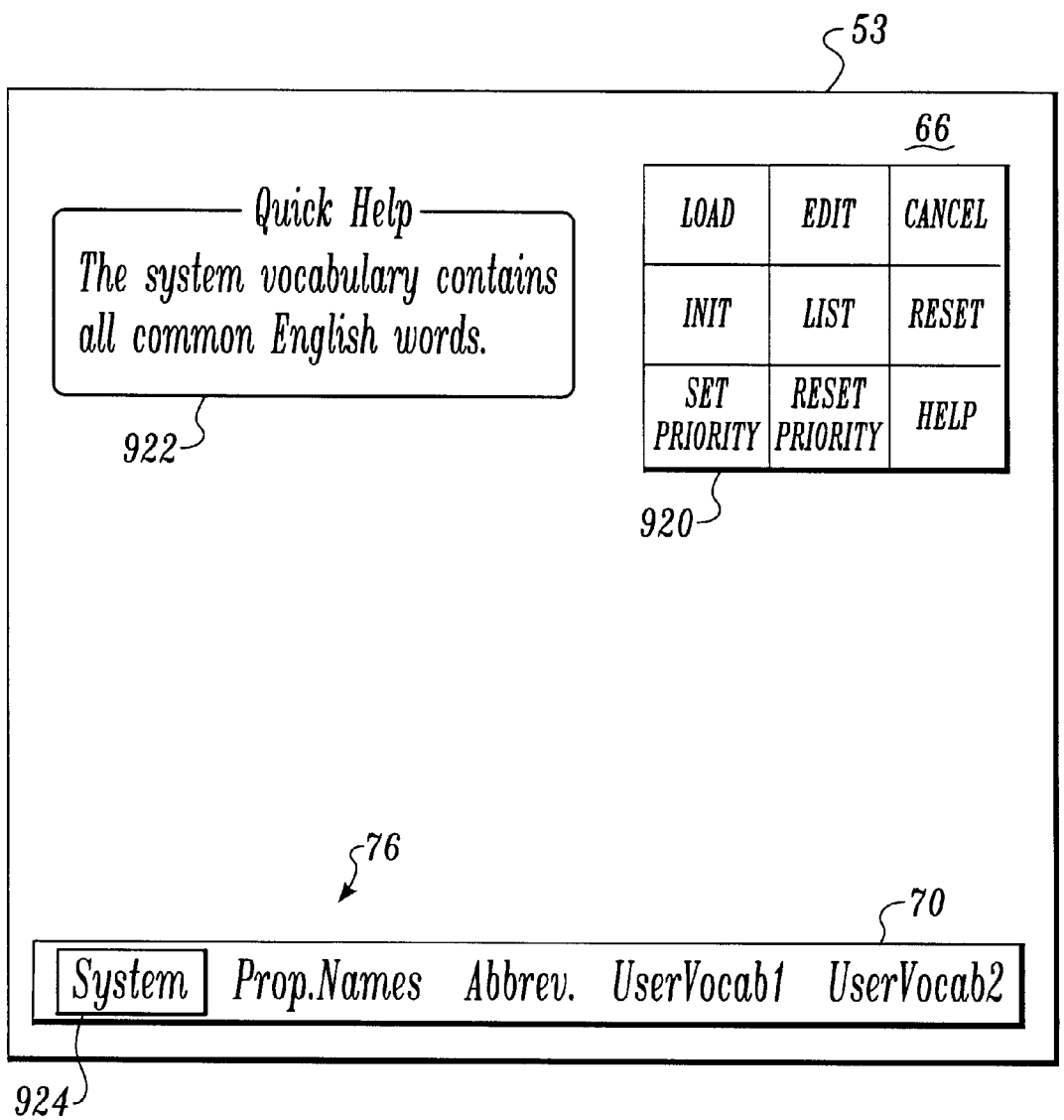

In FIG. 8D, the user has executed the "Load Vocab" command by depressing the upper left corner data key.

Executing the command causes a system menu of vocabulary modules that can be loaded to be displayed in the selection list. The first entry in the selection list, the standard system vocabulary module 924, has been boxed and selected by default. It will be appreciated that the disambiguating system allows nesting of menus as depicted in FIGS. 8C and 8D That is, an entry in the selection list may remap the data keys to a number of system commands, while executing a system command may lead to further choices presented as a system menu in the selection list. Nesting the menus in this manner allows multiple system functions and commands to be implemented with a minimum number of keys.

Figure 8E:
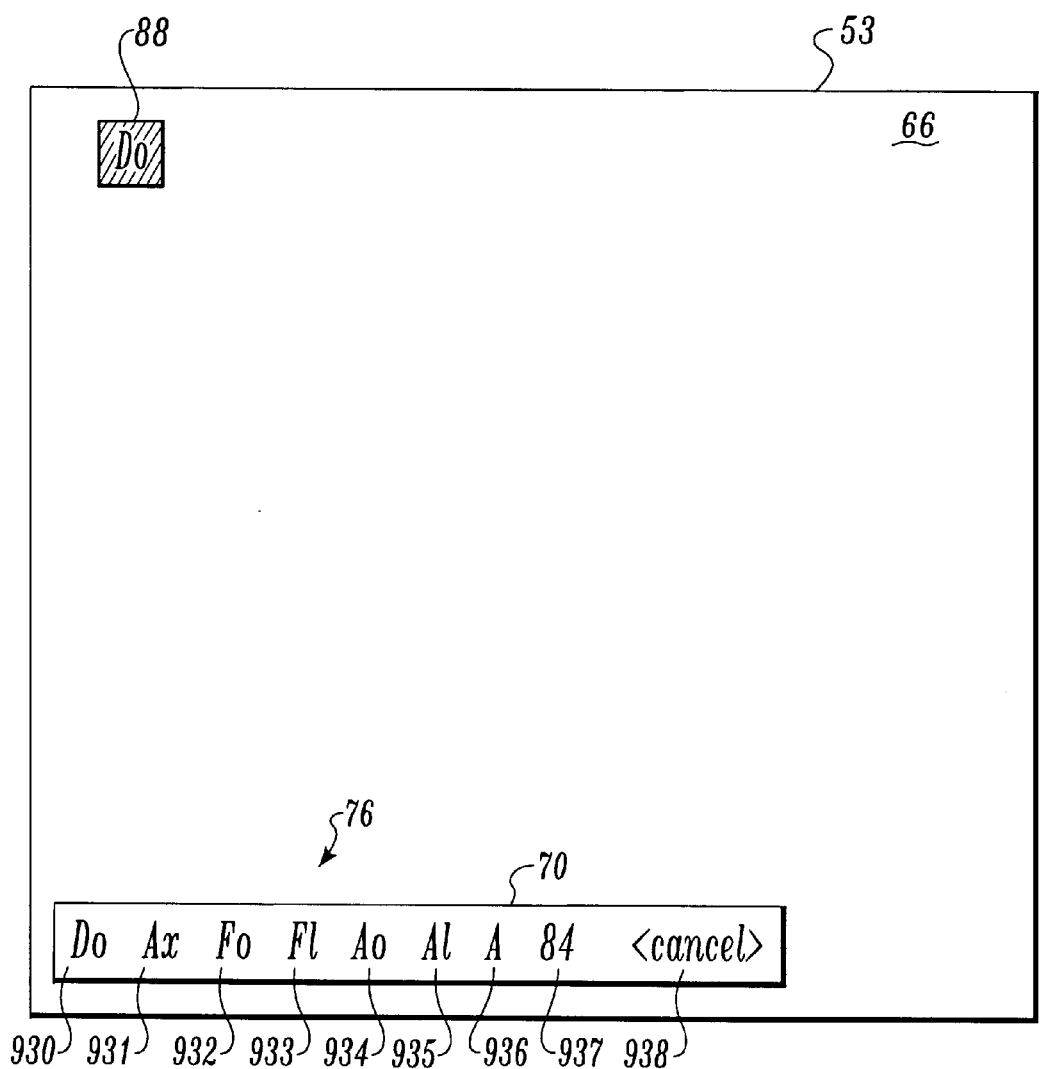

FIG. 8E results if the user presses the OLX key after FIG. 8A. The word vocabulary module has interpreted the ADF and OLX keys as the words "Do" 930 and "Ax" 931, and placed these words in the selection list 76. The stem vocabulary module has interpreted the keystrokes as the stems "Fo" 932, "Fl" 933, "Ao" 934 and "Al" 935. The two-stroke vocabulary module has interpreted the entered key sequence as the letter "A" 936. The numeric vocabulary module has interpreted the key sequence as the number "84" 937. The system command vocabulary module has matched the keystroke sequence with the system command "<cancel>" 938, and added the command to the selection list 76. The first entry from the selection list is provisionally posted at the insertion point 88 of the text region.

Figure 8F:
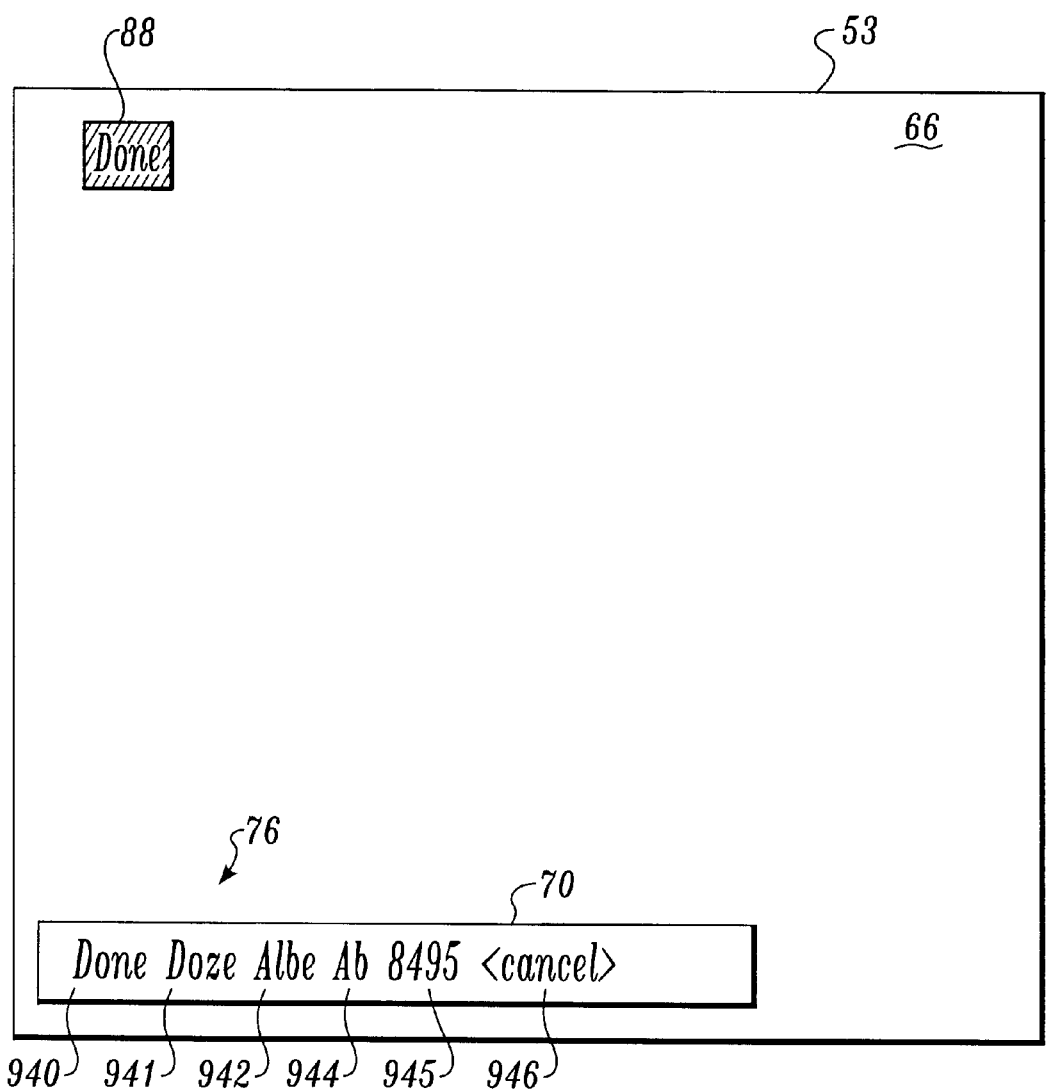

In FIG. 8F, the user has subsequently pressed the NBZ key followed by the EWV key. The word vocabulary module has matched the keystroke sequence to two words, "Done" 940, and "Doze" 941. By default, multiple words are ordered in the selection list 76 so that the most frequently occurring word appears first. "Done" is therefore listed before "Doze" in the selection list. The interpretations from the other vocabulary modules, namely, "Albe" 942, "Ab" 944, "8495" 945, and "<cancel>" 946 are provided in the selection list 76 after the word interpretation.

Figure 8G:
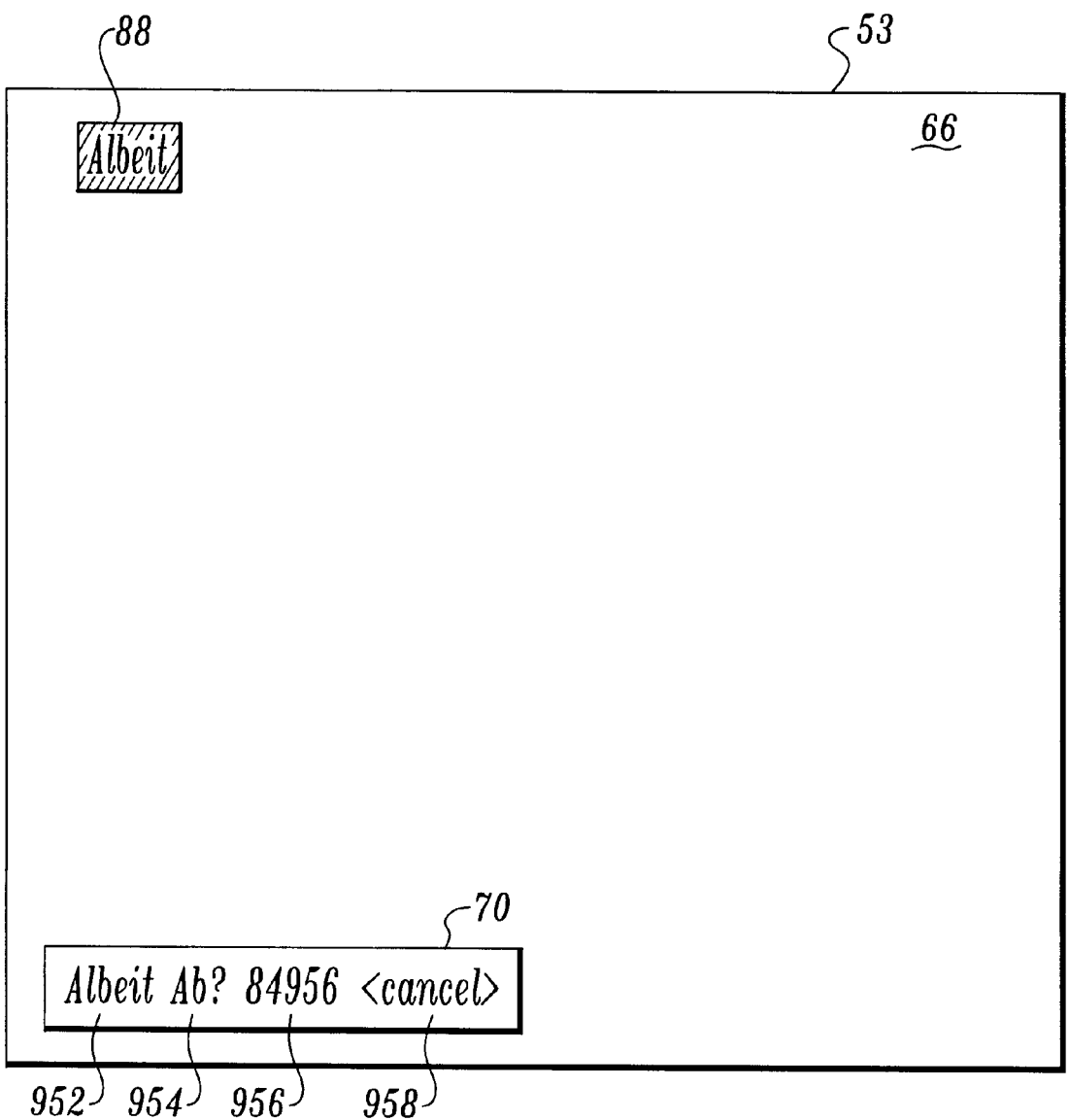

In FIG. 8G, the user has pressed the IMG key. The word vocabulary module has found no words that exactly match the keystroke sequence ADF OLX NBZ EWV IMG. However, by "looking ahead" the word vocabulary module has located a longer word, "Albeit" 952, and listed the word in the selection list as a possible interpretation. The two-stroke interpretation of the five keys results in the string "Ab?" 954 (the question mark indicating that the third letter is awaiting the sixth keystroke which will disambiguate the fifth), the numeric interpretation results in the number "84956" 956, and the system command interpretation still corresponds to "<cancel>" 958.

Figure 8H:
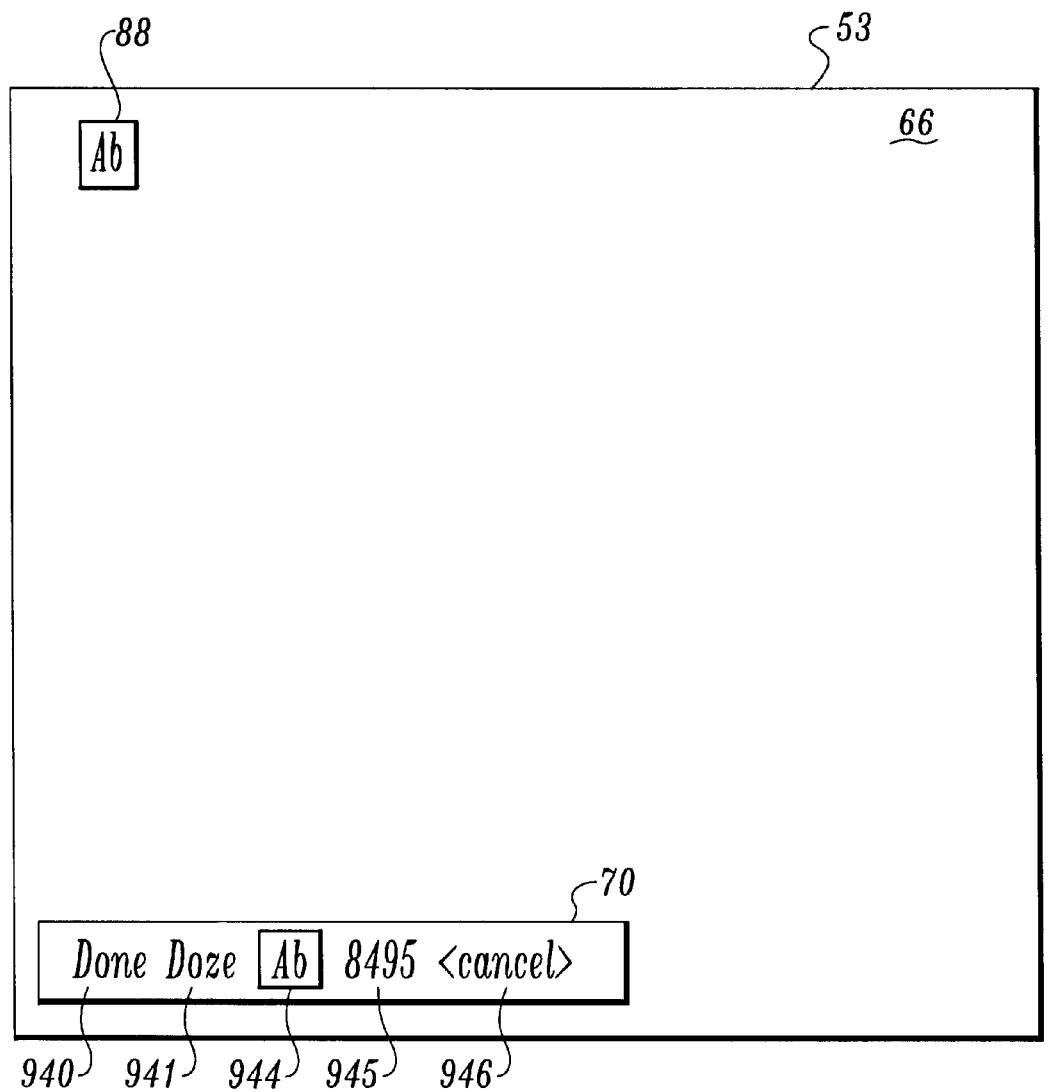

FIG. 8H results from FIG. 8F if the user presses the select key three times. The word stem "Albe" 942 is eliminated from the selection list on receipt of the first press of the select key. The two-stroke vocabulary module had added the string "Ab" 944 to the selection list. By pressing the select key three times, the user has highlighted the two-stroke interpretation, "Ab", causing a copy to be provisionally posted at the insertion point 88 in the text region 66. When the user presses a data key to start the following word, the word "Ab" is selected as the keystroke interpretation. The disambiguating system also automatically adds the word "Ab" to the user's custom vocabulary module, allowing the user to subsequently spell "Ab" with the two keystroke sequence ADF NBZ.

FIG. 8I results if the user presses and releases the select key after FIG. 8G, selecting the word "Albeit" 952. Pressing the select key causes the first entry in the selection list and the word at the insertion point to be boxed. The incomplete two-stroke specification "Ab?" 954, which resulted from an odd number of keystrokes, is eliminated from the selection list when the select key is pressed.

Figure 8J:
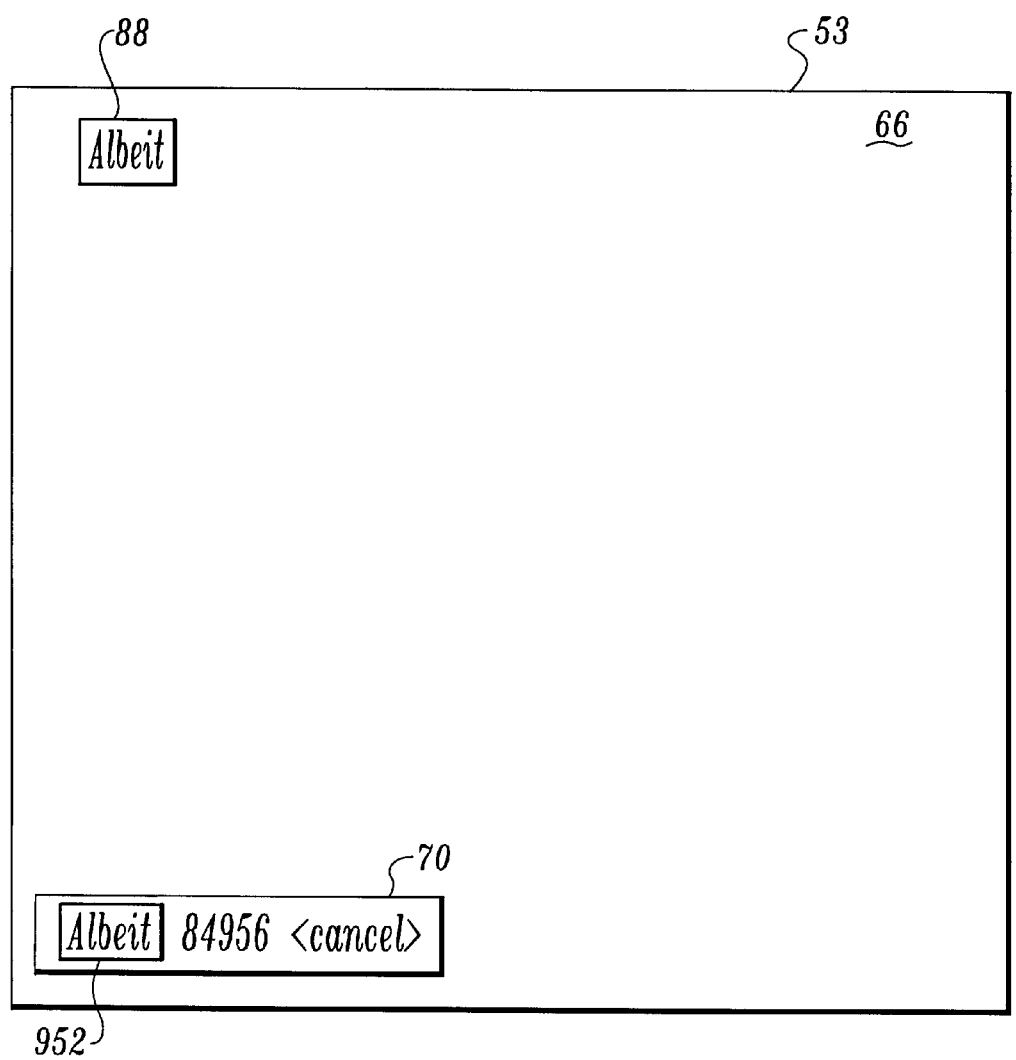
Figure 8J:
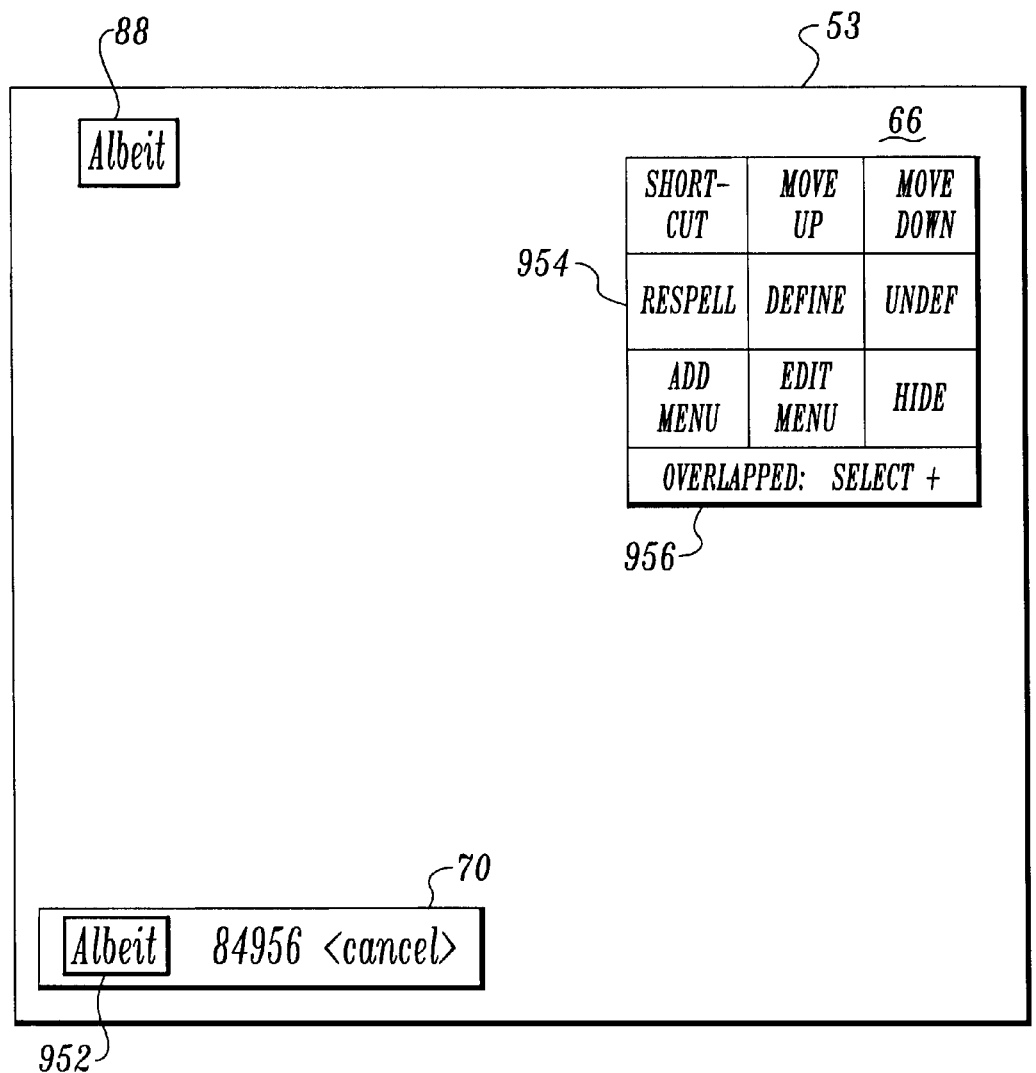

If the user presses and holds the select key 60 after FIG. 8G, instead of pressing and releasing the select key, then the display depicts the overlapped key meanings as shown in FIG. 8J. The overlapped key meanings are displayed in a 3×3 key map 954. Each box in the key map indicates the command that will result if the corresponding data key is pressed while the select key is being held down. A dialog box 956 is also provided to indicate that the overlapped keystroke combinations use the select key 60. It will be appreciated that other system keys 58 could similarly be used to implement an overlapped keystroke. Chorded key combinations are accessible at any time and can be entered without disturbing other input processes.

IV. Alternate Applications and Embodiments

While the preferred embodiment of the invention has been illustrated and described, it will be appreciated that various changes can be made therein without departing from the spirit and scope of the invention. For example, those skilled in the art will appreciate that the keyboard 54 of the reduced keyboard disambiguating system may have as few as three or as many as twenty data keys. The disambiguation technique disclosed herein is equally applicable to keyboards of different sizes.

Figure 9:
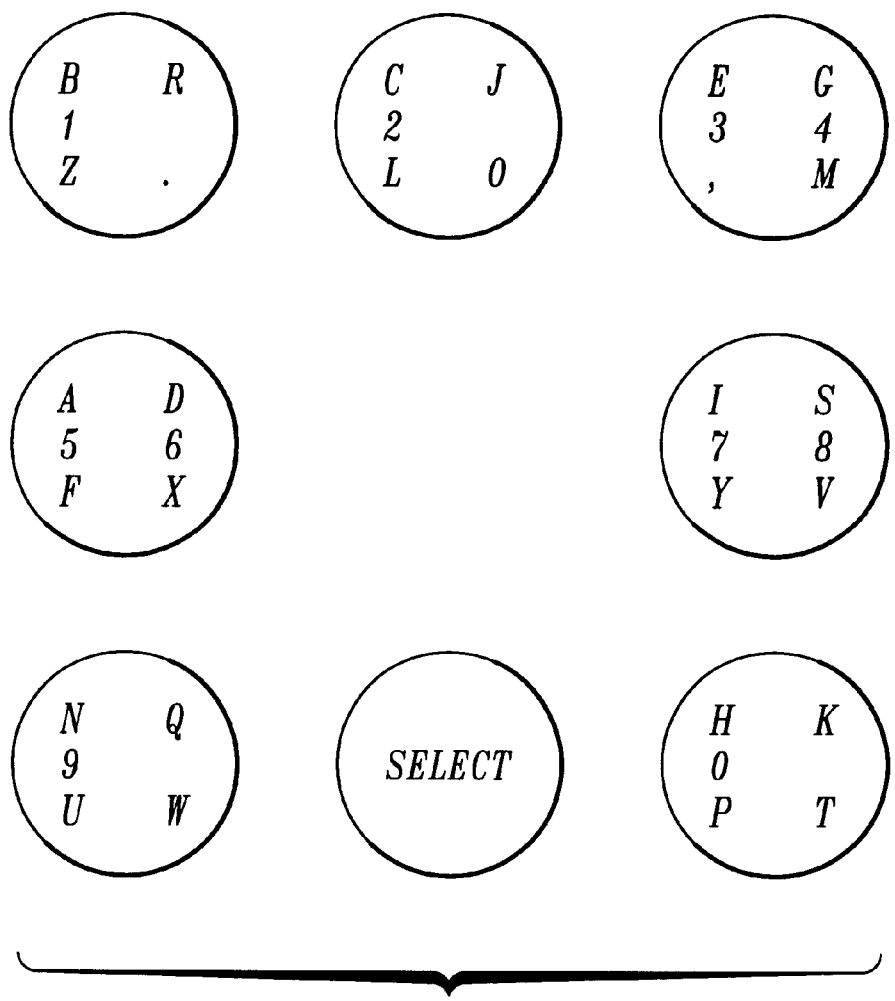
FIG. 9 is a diagram of an eight-key reduced keyboard layout for individuals with disabilities.

An embodiment of the reduced keyboard disambiguating system having eight keys is particularly suited for use by people with hand control disabilities. A suitable eight-key layout is shown in FIG. 9. Seven keys are used to enter letters or numbers, and one key is used as the "select" key. The eight keys are organized in a circle with each key corresponding to one of eight directions. When organized in a circle, each key may be easily selected by movement of a joystick, head-pointing, or by movement of the eye as detected by an eye-tracking device. Having eight keys allows each key to be represented numerically by three bits. For individuals with disabilities who work best with a Morse-like code, each ambiguous keystroke can be encoded as Morse-like sequences with an average code length of two (i.e., the average number of "dots" and "dashes" per letter is only two). For individuals with disabilities who work best with scanning, the eight-key system requires scanning across only eight keys rather than 26 or more. With eight keys in the reduced keyboard disambiguating system, more than 97% of all words require no additional keystrokes. Even higher efficiencies can be achieved using the "look-ahead" feature of the vocabulary modules discussed above.

Figure 10:
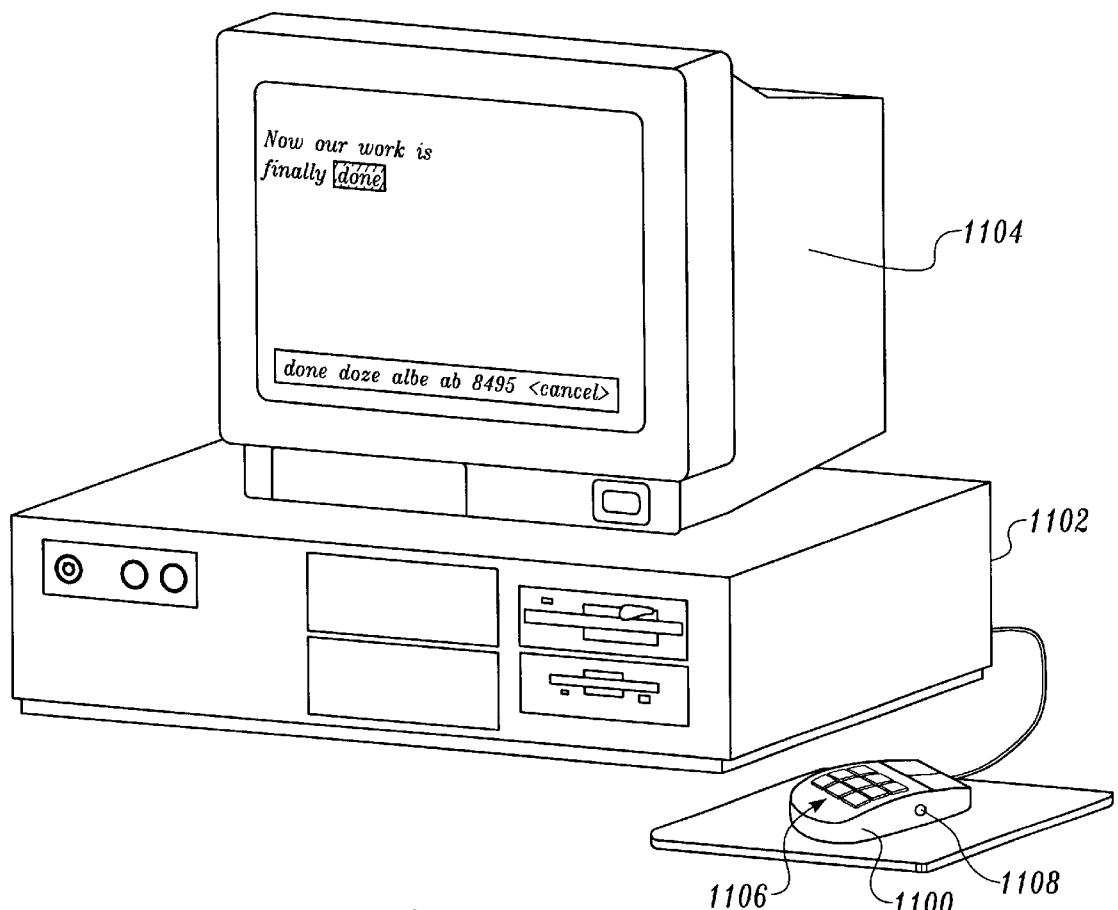
FIG. 10 is a perspective view of a mouse incorporating the reduced keyboard disambiguating system of the present invention.

It will also be appreciated that the reduced keyboard disambiguating system of the present invention may be used in conjunction with any computer input device. For example, a disambiguating system of the present invention is depicted in FIG. 10 as incorporated in a mouse 1100. The mouse is connected to a computer 1102 having a monitor 1104. Text entry is performed in the manner described above using a reduced set of data keys 1106 located on the upper surface of the mouse. A button 1108 located on the side of the mouse operates as an unambiguous system key to delimit entered keystroke sequences and select different interpretations from the displayed selection list. Incorporating a keyboard directly on the mouse is particularly advantageous in that a user does not have to switch between a mouse and a keyboard when operating in a graphical computer interface.

Figure 11:
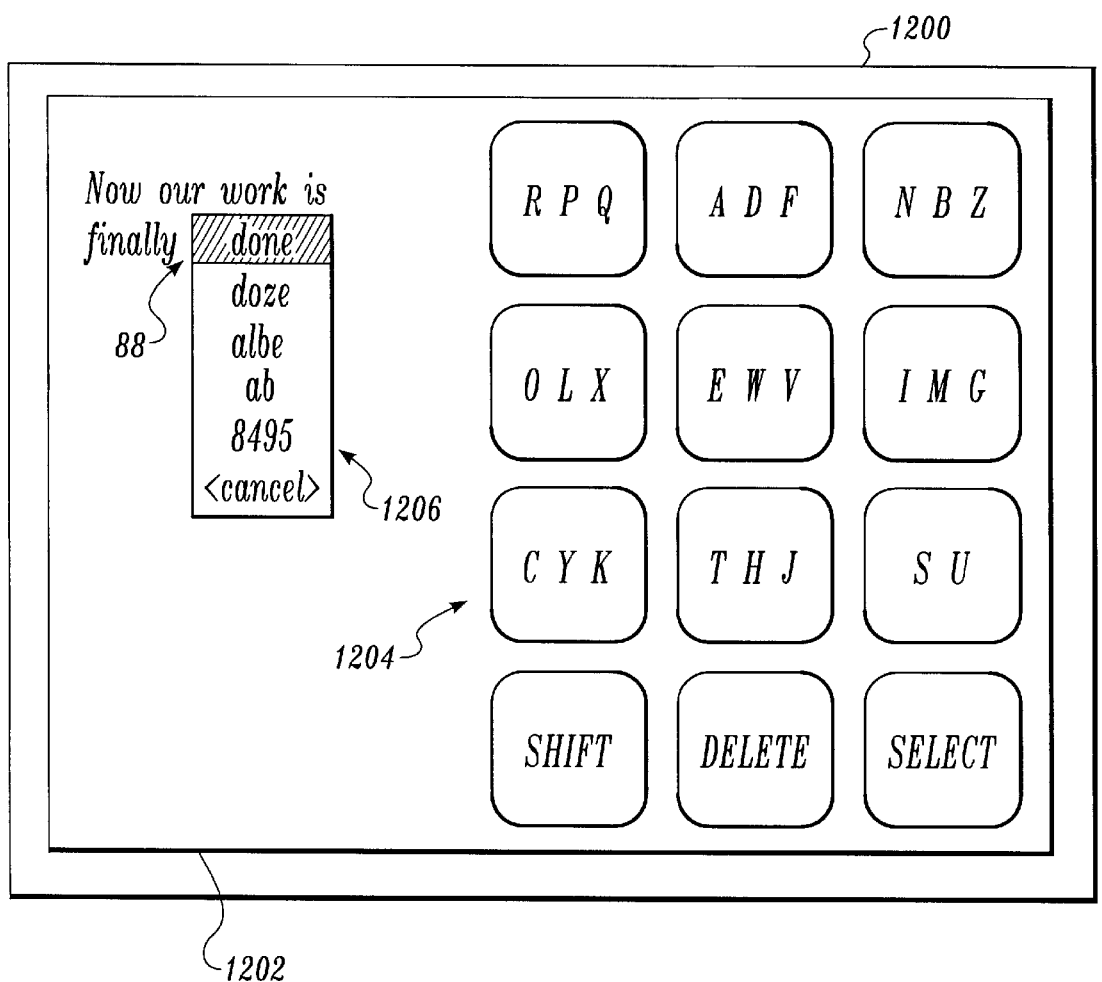
FIG. 11 is a perspective view of a two-way pager incorporating the reduced keyboard disambiguating system of the present invention.

The reduced keyboard disambiguating system may also be incorporated in any portable electronic device requiring accurate text entry using only a single hand. For example, in FIG. 11 a reduced keyboard disambiguating system of the present invention is depicted as being incorporated in a two-way pager 1200. The two-way pager is provided with a touch-sensitive screen 1202 to display messages to a user and to allow the user to enter messages into the pager. Rather than having a separate typewriter-style keyboard, a keyboard 1204 is displayed on the touch-sensitive screen. Contact by a user with the touchscreen at a location above a depicted key is interpreted by the system as a keystroke. To aid the user in locating the keys on the touchscreen, a transparent or semitransparent grid or raised area may be formed on the surface of the keypad above each key. The user would therefore receive a visual or tactile indication of the location of their fingers on the touchscreen with respect to the keyboard. It will be appreciated that the keyboard 1204 may also be overlaid over the area of the touchscreen that displays messages to the user. In this embodiment, the user would periodically move their hand to review the entered text on the display.

Text would be entered into the pager 1200 in a similar manner to the applications discussed above. Rather than displaying the selection list in a selection list region, however, a selection list 1206 in the pager application is displayed at the insertion point 88 in the text window. The first entry in the selection list is highlighted, and the user may select the first entry or other entries using the select key in the manner described above. Once the disambiguation of the keystroke sequence is complete, the selection list 1206 is removed and the selected entry left as the last word in the entered line of text. Displaying the selection list at the insertion point in the text speeds the text entry since the user's point of gaze does not have to be removed from the text being entered.

Figure 12:
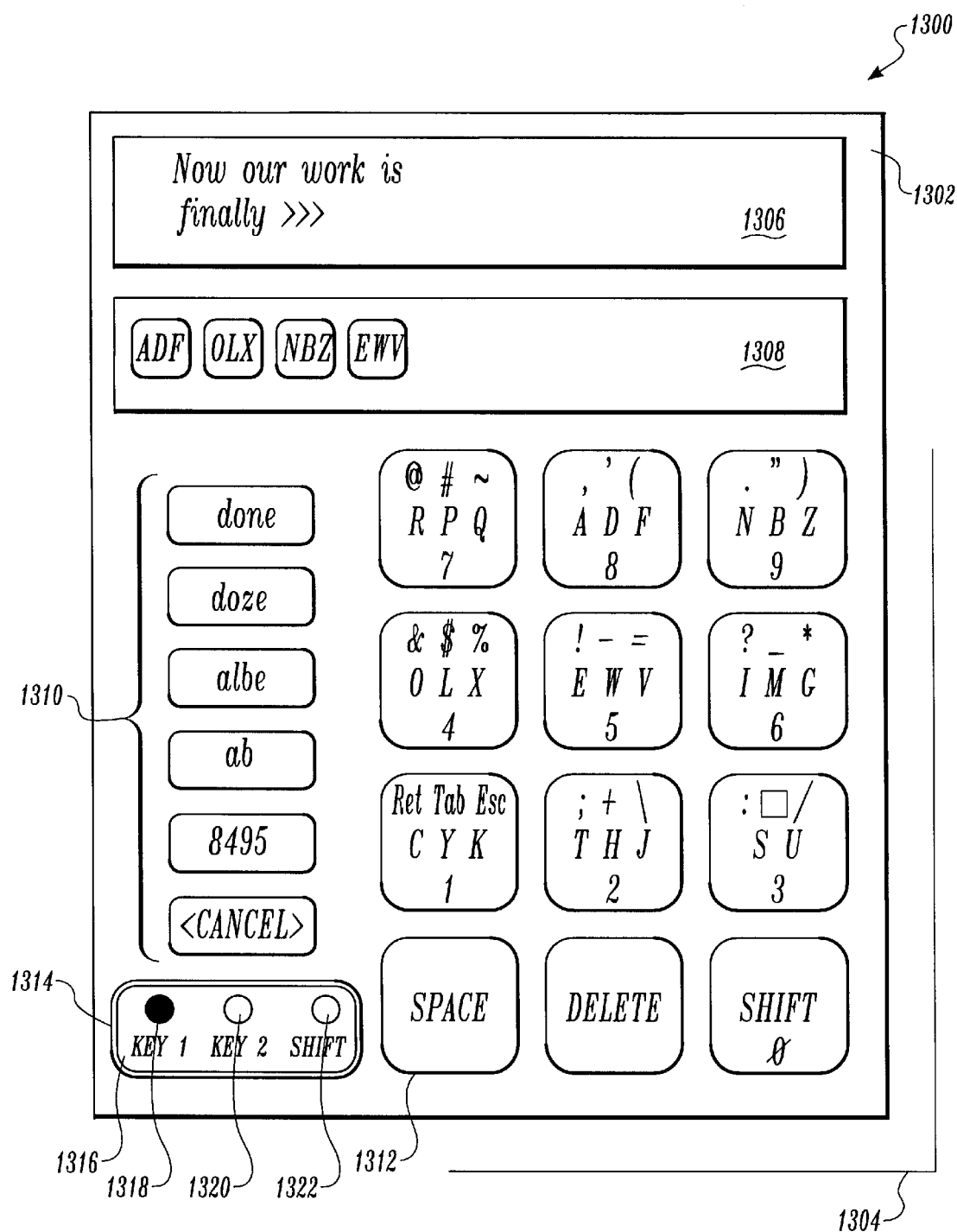
FIG. 12 is a front elevation of an alternate embodiment of a reduced keyboard disambiguating system in accordance with the present invention having a plurality of keys for display of a selection list.

An alternate embodiment of a portable reduced keyboard disambiguating system 1300 is shown in FIG. 12. The front panel of the system is a touch-sensitive, color liquid crystal display (LCD) 1302 that displays information to a user and also accepts user input. The entire front panel of the system is touch sensitive, so that contact with the surface of the reduced keyboard generates input signals to the system corresponding to the location of contact. The reduced keyboard contains twelve keys 1304 arranged in the preferred layout described above.

Rather than defining regions on a single display to display information to a user, several windows are provided in the disambiguating system 1300. A text window 1306 displays several lines of text entered by the user to allow text input and editing. A keystroke window 1308 displays symbols corresponding to the individual keystrokes entered by the user in the order of entry. The keystroke window provides visual feedback to the user and also allows editing of the keystroke sequence.

Instead of a selection list, a set of selection list keys 1310 are provided to display a selection list corresponding to an ambiguous keystroke sequence entered by a user. Each selection list entry appears directly on the face of a key. A user selects the desired entry from the selection list by pressing the associated key. Since sequential access to the selection list is no longer required, the select key of the preferred disambiguating system is assigned the function of a space key 1312. In this embodiment it is useful, for ergonomic reasons, to associate a region 1314 of the touch-sensitive LCD with the first entry of the selection list. Designating region 1314 as a key corresponding to the first entry in the selection list allows the user to rapidly select the first entry using the thumb without moving his or her hands from the data keys.

A status window 1316 is also provided in the disambiguating system to display to the user the current state of the system. Indicator fields 1318, 1320 in the status window show whether the next keystroke will be the first or second keystroke of a keystroke pair. In FIG. 12, indicator field 1318 is "on" to indicate that the next keystroke is the first keystroke of a keystroke pair. An indicator field 1322 is also provided to indicate when the shift key has been depressed and that the next letter entered will be capitalized.

The embodiment of the reduced keyboard disambiguating system depicted in FIG. 12 operates in a similar manner to the preferred embodiment, but the touchscreen expands the flexibility of the system. Because each of the windows are touch sensitive, a user may select words or other symbols displayed in the windows by touching the LCD at the appropriate location. For example, a user can directly enter the editing mode by touching a word to edit in the text window 1306. The faces of the keys in the keyboard 1304 may also be changed by the system to reflect different key interpretations. It therefore is not necessary to provide a key map in the text window to reflect different key meanings, since the faces of the keys can be directly changed to reflect the different meanings.

Figure 13:
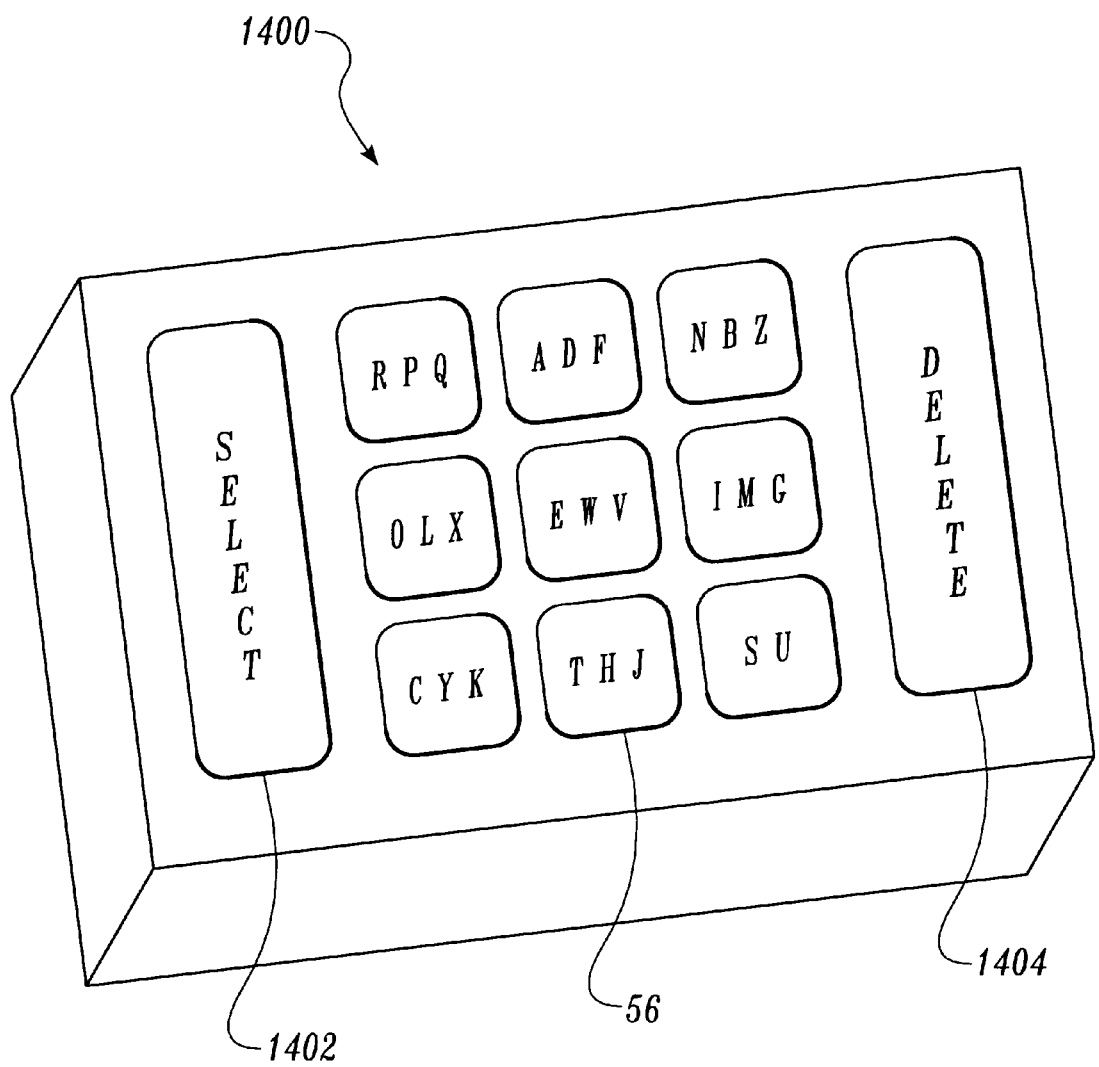
FIG. 13 is a front perspective of yet another alternate embodiment of a reduced keyboard disambiguating system in accordance with the present invention, having a select key and a delete key positioned on either side of an array of data keys.

Variations can also be made in the construction and operation of each of the above embodiments. Those skilled in the art will appreciated that alternate arrangements exist for the keyboard 54 of the reduced keyboard disambiguating system. A 3×3 array of data keys 56 is preferred because the arrangement is easy to manipulate with the middle three fingers of a user's hand. All keystrokes are either on a center home row, or one row up or down. The system keys 58, however, may be arrayed in different locations in order to speed text entry by the user. For example, as shown in a reduced keyboard disambiguating system 1400 in FIG. 13, a select key 1402 may be located on the left-hand side of data keys 56, and a delete key 1404 may be located on the right-hand side of the data keys. Locating the select and delete keys adjacent each side of the data keys simplifies operation of the keyboard since the user may use his or her thumb to operate the select key and his or her pinky to operate the delete key. The data keys 56 are operated by the middle three fingers of the user.

The 3×3 array of data keys 56 is also the preferred arrangement because a 3×3 array easily maps to other common user input devices other than keyboards. The user input device must be capable of moving to a number of states that correspond to the number of keys in the selected reduced keyboard. For example, a joystick can be substituted for the keyboard in the reduced keyboard disambiguating system. A keystroke is simulated by movement of the joystick. Moving the joystick in one of eight radial directions, each direction corresponding to a distinct state, and returning the joystick to a center default position corresponds to a keystroke on one of the outer circle of data keys. Pressing the joystick down while in the center default position corresponds to a keystroke on the center key of the data keys. A joystick button acts as a select key or other unambiguous system key. A user may therefore enter text using the joystick by moving the joystick to various states in order simulate the desired keystrokes. The disambiguating system would disambiguate the ambiguous keystrokes in the manner described above.

Other input devices can also be substituted for the keyboard in the reduced keyboard disambiguating system. As depicted in FIG. 14, a control disk 1454 may be incorporated in a PDA 1452 or other portable electronic device. Control disk 1454 is a generally flat disk that may be tipped eight radial directions. Tipping the control disk in one of the eight radial directions generates a unique signal corresponding to the particular direction. The control disk is biased to return to a center default position after movement in a radial direction. Moving the control disk in one of the eight radial directions and returning the control disk to the center default position is mapped to a keystroke on one of the outer circle of data keys. The control disk may also be pressed to generate a ninth unique signal. Pressing the control disk 1454 while in the center default position is mapped to a keystroke of the center key of the data keys. A dedicated select button 1456 and a dedicated delete button 1458 are locating on either side of the control disk. A user may therefore enter text using the control disk to simulate desired keystrokes. A disambiguating system 1450 connected to the control disk and incorporated in the PDA would disambiguate the ambiguous state sequence in the manner described above.

Another portable electronic device benefitting from the reduced size of the control disk is a watch. A watch could incorporate a small control disk on the face of the watch and the disambiguating system discussed above to allow a user to enter text messages into the watch. The messages may subsequently be downloaded or transferred to another system.

Several commercial user input devices are available that are particularly applicable for text entry using a mapping method like a joystick. For example, Interlink Electronics of Camarillo, Calif., manufactures a handheld pointing device called a ProPoint for use in audio-visual presentations. The pointing device is a generally flat disk that may be tipped radially to specify a direction, or pressed to act as a button. The pointing device also contains two dedicated buttons, one located above the control disk and the other located below the control disk. The device manufactured by Interlink may be readily adapted to operate with a disambiguating system by dividing the 360° movement of the control disk into eight segments, each of the segments mapped to a keystroke of one of the outer circle of data keys. Pressing the control disk corresponds to a keystroke of the center data key. The button located below the control disk corresponds to the select key, and the button located above the control disk corresponds to the delete key. When mapped in this manner, a user may rapidly input text using the technique described above.

Figure 15A:
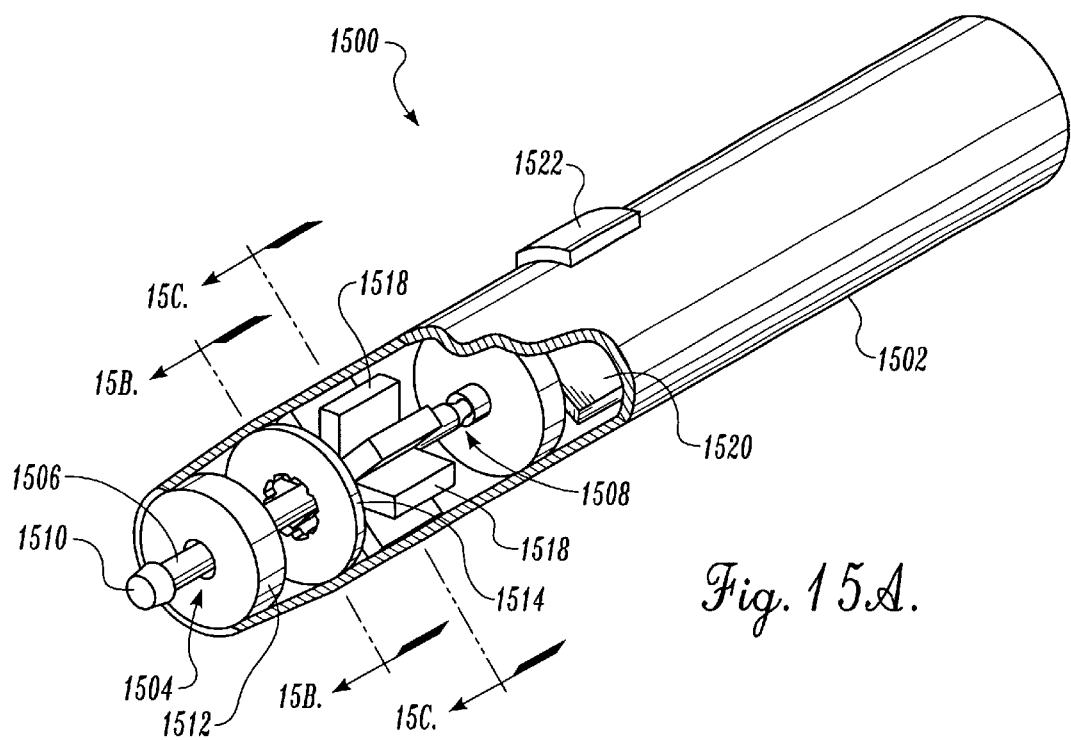
FIGS. 15A–15C are perspective and cross-section views of still another embodiment of a reduced keyboard disambiguating system in accordance with the present invention having a pen-shaped body.

A portable disambiguating system 1500 is shown in FIG. 15A. The portable disambiguating system has a body 1502 that is generally shaped like a pen so that it may be easily grasped by a user. Protruding from an aperture 1504 at the tip of the body is an input shaft 1506. One end of the input shaft 1506 is anchored inside the body by a ball and socket joint 1508. The other end of the input shaft extends from the tip of the body, and terminates in a high-friction tip 1510. The ball and socket joint within the body of the pen allows the input shaft to pivot about the joint.

The pivoting motion of the input shaft 1506 is constrained in two ways. First, a resilient bumper 1512 is positioned in the aperture at the tip of the disambiguating system body. The bumper surrounds the input shaft and contacts the input shaft near the tip 1510. The bumper compresses as the input shaft pivots around the ball and socket joint to allow the input shaft to deflect from a default center position. When a pivoting force is removed from the input shaft, the bumper biases the input shaft to return to the default center position.

Figure 15B:
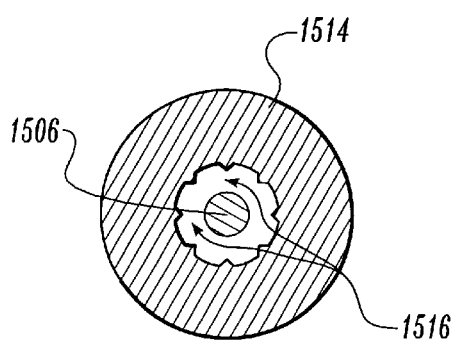

The pivoting motion of the input shaft is also constrained by an inflexible limiting disk 1514 which encircles the input shaft at a point between the bumper 1512 and the ball and socket joint 1508. A cross-section of the limiting disk is shown in FIG. 15B. The limiting disk 1514 is formed with eight cut-out segments 1516 that correspond to the shape of the input shaft. When the input shaft is moved outward from the default center position, the limiting disk limits the input shaft motion to one of eight radial directions corresponding to the cut-out segments.

Figure 15C:
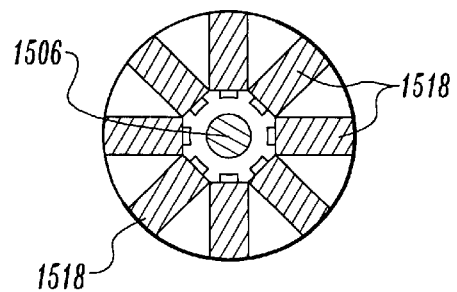

Eight switches 1518 are radially positioned around the input shaft 1506 inside the body 1502 of the portable disambiguating system. The switches are oriented so that each switch corresponds to one of the eight radial directions of input shaft movement defined by the limiting disk, as shown in the cross-section of FIG. 15C. Movement of the input shaft away from the default center position therefore brings the input shaft into contact with one of the eight switches. An additional switch is also located at the ball and socket joint 1508 of the input shaft. The additional switch is activated by a downward movement of the portable disambiguating system body, forcing the input shaft into the body of the disambiguating system.

The eight radial switches 1518 and the ninth switch at the ball and socket joint 1508 are connected to processing circuitry contained on a circuit card 1520 within the body of the portable disambiguating system. The processing circuitry includes a processor, associated memory, and a communications interface. Disambiguating software and vocabulary modules are stored within the processing circuitry to allow the disambiguating system to operate as a standalone device.

The eight radially mounted switches, and the ninth switch located at the ball and socket joint, are mapped using the technique described above to the nine data keys. One or more buttons 1522 are provided on the outer surface of the body 1502 to act as an unambiguous select and/or delete key. A user enters text with the portable disambiguating system 1500 by placing the tip 1510 of the input shaft on any available surface and moving the body of the pen around the input shaft to simulate keystrokes. The tip of the input shaft prevents the input shaft from sliding on the surface where it rests. Sufficient memory is provided on the circuit board 1520 so that text may be stored within the portable system and later downloaded to a computer. Alternatively, a direct connection may be made from the portable system to a computer or other electronic device having a display so that a user may view the text as it is being entered.

It will be appreciated that the portable system shown in FIG. 15A may also include a display on the body 1502 of the device to allow the user to view the text as it is being entered. Preferably, the display would scroll text through the display window as the user enters text.

While the above discussion relates to the use of the reduced keyboard disambiguating system with Roman characters and English, it will be appreciated that the system is equally operable with foreign languages using different character sets. Foreign language versions would operate a similar manner, with the foreign character set grouped on the keys of the keyboard to optimize the keyboard and minimize the ambiguity in the particular language, or across multiple languages.

Those skilled in the art will also recognize that additional vocabulary modules can be enabled within the computer, for example vocabulary modules containing legal terms, medical terms, and foreign language terms. Via a system menu, the user can configure the system so that the additional vocabulary words can be caused to appear first or last in the list of possible words, with special coloration or highlighting. The disambiguation system can also be set so that the selection of such a word causes an audible warning beep.

Those skilled in the art will further recognize that the input device, in particular the keyboard, can be separated from the rest of the disambiguating system. In this embodiment, the portable device would comprise a keyboard and associated memory. Ambiguous keystrokes entered by a user are stored in the memory. The portable device is subsequently connected to the rest of the disambiguating system and the entered keystroke sequences disambiguated. This approach is particularly inexpensive since the portable input device is greatly simplified. Consequently, within the scope of the appended claims, it will be appreciated that the invention can be practiced otherwise than as specifically described herein.

The embodiments of the invention in which an exclusive property or privilege is claimed are defined as follows:

1. An input disambiguating method for disambiguating ambiguous input sequences entered by a user on a user input device having a plurality of inputs, each of the plurality of inputs being associated with a plurality of characters, the disambiguating method comprising:

generating an input sequence each time an input is selected by manipulating the user input device, wherein the generated sequence corresponds to the sequence of inputs that have been selected and has a textual interpretation that is ambiguous due to the plurality of characters associated with each input;

identifying at least one object from a plurality of objects that are stored in a memory that is coupled to the user input device, the plurality of objects including textual objects that are completed words and textual objects that comprise a string of characters corresponding to the initial characters of an uncompleted word, at least one object of the plurality of objects being associated with each generated input sequence and each of the plurality of objects being associated with an input sequence and a frequency of use;

automatically selecting an object having a highest frequency of use from the identified objects associated with each generated input sequence; and generating an output signal causing an output device to provide the user the selected object as a textual interpretation of the entered input sequence.

2. The disambiguating method of claim 1, further comprising:

generating a select signal upon activation of an unambiguous selection input included in the user input device.

3. The disambiguating method of claim 1, further comprising:

accepting the object having the highest frequency of use as the textual interpretation of the entered input sequence by manipulating the user input device to activate an unambiguous input included in the user input device.

4. The disambiguating method of claim 1, further comprising:

generating an output signal causing the output device to provide at least two of the identified objects associated with the same input sequence as possible textual interpretations of the entered input sequence.

5. The disambiguating method of claim 4, further comprising providing the identified objects to the user in order of decreasing frequency of use.

6. The disambiguating method of claim 3, further comprising:

selecting an alternate textual interpretation of the input sequence by repeated manipulations of the user input device to activate the unambiguous selection input, each manipulation of the user input device to activate the unambiguous input selecting a different object from the identified plurality of objects with the different objects associated with the input sequence being selected in order of decreasing frequency of use.

7. The disambiguating method of claim 6, further comprising:

displaying at least two of the plurality of identified objects in a list, wherein the list is truncated to omit objects that exceed a threshold number of objects to display, and wherein said omitted objects are displayed in the list following one or more manipulations of the user input device to activate the unambiguous selection input.

8. An input disambiguating method for disambiguating ambiguous input sequences entered by a user on a user input device having a plurality of inputs, each of the plurality of inputs being associated with a plurality of characters, the disambiguating method comprising:

generating an input sequence each time an input is selected by manipulation of the user input device, wherein the generated sequence corresponds to the sequence of inputs that have been selected and has a textual interpretation that is ambiguous due to the plurality of characters associated with each input;

identifying a plurality of objects associated with each generated input sequence, each of the plurality of objects being associated with an input sequence, the plurality of objects being contained in a memory and being stored as a plurality of object types, the object types including a completed word type comprising textual objects that are completed words and a word stem type comprising textual objects that comprise a string of characters corresponding to the initial characters of an uncompleted word;

generating an output signal causing a display to display a selection list comprising identified objects, with the selection list including identified objects from a plurality of object types when a plurality of object types are associated with a generated input sequence.

9. The disambiguating method of claim 8, further comprising:

emitting a desired one of a plurality of tones based on the objects in the selection list.

10. The disambiguating method of claim 8, wherein each of the plurality of objects in the memory are further associated with a frequency of use.

11. The disambiguating method of claim 10, further comprising:

displaying a plurality of objects associated with a generated input sequence in order of decreasing frequency of use.

12. The disambiguating method of claim 8, wherein each of the plurality of object types is further associated with a priority.

13. The disambiguating method of claim 12, further comprising:

ordering each of the plurality of objects in the selection list according to the priority associated with the object type associated with each object.

14. The disambiguating method of claim 8, wherein one of the plurality of object types is a character interpretation of an input sequence, which interprets at least one input in the input sequence as an unambiguously specified character.

15. The disambiguating method of claim 8, wherein one of the plurality of object types is a proper noun interpretation of an input sequence, the proper noun interpretation associating at least one character to at least one input in the input sequence to form a completed proper noun.

16. The disambiguating method of claim 15, further comprising:
generating a shift signal when the user input device is manipulated to activate an unambiguous shift input included in the user input device.

17. The disambiguating method of claim 16, further comprising:
displaying objects associated with the proper noun interpretation object type in the selection list before the objects associated with each of the other plurality of interpretations when the processor detects the shift signal before receiving an input sequence.

18. The disambiguating method of claim 8, further comprising:
selecting the object types that are displayed in the selection list.

19. The disambiguating method of claim 18, further comprising:
selecting a desired priority between the plurality of object types that are displayed in the selection list.

20. An input disambiguating method for disambiguating ambiguous input sequences entered by a user on a user input device having a plurality of inputs, at least a portion of the plurality of inputs being associated with a plurality of characters, the disambiguating method comprising:
generating an input sequence each time an input is selected by manipulating the user input device, wherein the generated sequence corresponds to the sequence of inputs that have been selected and has a textual interpretation that is ambiguous due to the plurality of characters associated with each input;
identifying a plurality of objects that are contained in a memory that is coupled to the user input device, the plurality of objects including word objects comprising textual objects that are completed words and word stem objects comprising textual objects that include a string of characters corresponding to the initial characters of an uncompleted word, at least one object of the plurality of objects associated with the generated input sequence being a word object and at least one of the plurality of objects associated with the generated input sequence being a word stem object, each of the plurality of objects contained in memory being associated with an input sequence and a frequency of use;
generating an output signal causing a display to display at least one of the identified word objects and at least one of the word stem objects associated with the generated input sequence as textual interpretation of the generated input sequence.

21. The disambiguating method of claim 20, further comprising:
presenting the identified objects associated with the input sequence to the user in order of decreasing frequency of use.

22. The disambiguating method of claim 21, further comprising:
generating a select signal when a user manipulates the user input device to activate an unambiguous selection input included in the user input device to accept a displayed word object.

23. The disambiguating method of claim 21, further comprising:
terminating an input sequence by the user manipulating the user input device to activate an unambiguous input comprised within the user input device.

24. The disambiguating method of claim 23, further comprising:
automatically selecting word object having a highest frequency of use from the identified objects as the textual interpretation of the ambiguous input sequence upon detecting the manipulation of the user input device to activate the unambiguous input.

25. The disambiguating method of claim 22, further comprising:
selecting word object having a next lower frequency of use from the identified objects upon each manipulation of the user input device to activate the unambiguous input.

26. The disambiguating method of claim 24, further comprising:
entering a second input sequence following the manipulation of the user input device to activate an unambiguous input.

27. The disambiguating method of claim 26, further comprising:
automatically appending a single space to the selected textual interpretation of the received input sequence that is shown on the display following one or more manipulations of the user input device to activate the unambiguous selection input in an uninterrupted sequence.

28. The disambiguating method of claim 20, further comprising:
storing the plurality of objects in the memory in a tree comprised of a plurality of nodes, each node being associated with an input sequence and being associated with a plurality of objects to store word objects and word stem objects that are associated with the same input sequence are stored at the same node.

29. The disambiguating method of claim 28, wherein the plurality of nodes are connected by a plurality of paths, each of the plurality of paths linking a parent node associated with a base input sequence with a child node associated with the base input sequence of the parent node and an additional input sequence.

30. The disambiguating method of claim 29, wherein the objects associated with a child node are based on the objects associated with the corresponding parent node to which the child node is linked.

31. The disambiguating method of claim 30, wherein the objects associated with a child node are constructed using a code to modify objects associated with the corresponding parent node.

* * * * *

UNITED STATES PATENT AND TRADEMARK OFFICE
CERTIFICATE OF CORRECTION

PATENT NO.    : 6,307,549 B1
DATED         : October 23, 2001
INVENTOR(S)   : M.T. King et al.

It is certified that error appears in the above-identified patent and that said Letters Patent is hereby corrected as shown below:

Title page,
Item [57], ABSTRACT,
Line 2, "number of keys." should read -- number of keys is disclosed. --
Line 27, "method are" should read -- method is --

Column 29,
Line 54, "claim 1," should read -- claim 2, --

Column 30,
Line 35, "word;" should read -- word; and --

Column 31,
Line 47, "use;" should read -- use; and --

Column 32,
Lines 12 and 19, "selecting word object" should read -- selecting a word object --
Line 44, "sequence are stored" should read -- sequence being stored --

Signed and Sealed this

Thirtieth Day of July, 2002

Attest:

JAMES E. ROGAN
Attesting Officer     Director of the United States Patent and Trademark Office